(12) United States Patent
Okamura

(10) Patent No.: US 10,311,915 B2
(45) Date of Patent: Jun. 4, 2019

(54) IMAGE PROCESSING APPARATUS AND METHOD FOR CONTROLLING THE SAME

(71) Applicant: CANON KABUSHIKI KAISHA, Tokyo (JP)

(72) Inventor: Satoshi Okamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/033,784

(22) Filed: Sep. 23, 2013

(65) Prior Publication Data

US 2014/0023349 A1 Jan. 23, 2014

Related U.S. Application Data

(63) Continuation of application No. 13/325,510, filed on Dec. 14, 2011, now Pat. No. 8,564,696.

(30) Foreign Application Priority Data

Dec. 24, 2010 (JP) ................. 2010-287082

(51) Int. Cl.
*H04N 9/73* (2006.01)
*G11B 27/036* (2006.01)
*H04N 5/262* (2006.01)

(52) U.S. Cl.
CPC ......... *G11B 27/036* (2013.01); *H04N 5/2621* (2013.01)

(58) Field of Classification Search
CPC ...... H04N 5/351; H04N 5/235; H04N 5/2351; H04N 5/2354

(Continued)

(56) References Cited

U.S. PATENT DOCUMENTS 5,185,808 A 2/1993 Cok
5,459,529 A 10/1995 Searby
(Continued)

FOREIGN PATENT DOCUMENTS

CN 101897174 A 11/2010
JP 11-085955 A 3/1999
(Continued)

OTHER PUBLICATIONS

Masahide Abe, et al., "Degradation Models of Old Film Sequences and Generation of Artificial Degraded Sequences", Proceedings of the 2007 IEICE Engineering Sciences Society Conference, pp. SS-5.

*Primary Examiner* — Yogesh K Aggarwal
(74) *Attorney, Agent, or Firm* — Canon U.S.A., Inc. IP Division

(57) ABSTRACT

Grain noise and scratches are applied to an input image as random noise to generate a combined image. When applying grain noise clipped from two-dimensional noise data to the input image, each time clipping is performed, a positional difference from a last clipping position is evaluated. When the positional difference is determined to be small, a current clipping position is changed. When applying scratches clipped from noise data of a plurality of patterns to an input image, when a condition for successively applying scratches for a predetermined time period is selected, a positional difference from a last pasting position is evaluated. When the positional difference is determined to be large, the application of scratches is invalidated.

38 Claims, 30 Drawing Sheets

(58) Field of Classification Search
USPC .......... 348/224.1–228.2, 362, 241, 243, 239
See application file for complete search history.

(56) References Cited

U.S. PATENT DOCUMENTS

| | | | |
|---|---|---|---|
| 5,729,623 A * | 3/1998 | Omatu et al. | 382/155 |
| 6,201,581 B1 * | 3/2001 | Moriwake et al. | 348/587 |
| 2004/0056859 A1 * | 3/2004 | Ohba | G06T 15/50 345/426 |
| 2004/0130554 A1 | 7/2004 | Bangham | |
| 2005/0094892 A1 * | 5/2005 | Choe | G06T 5/008 382/274 |
| 2006/0133686 A1 | 6/2006 | Gomila | |
| 2006/0182183 A1 | 8/2006 | Winger | |
| 2006/0253783 A1 | 11/2006 | Vronay | |
| 2007/0036452 A1 | 2/2007 | Llach | |
| 2007/0070241 A1 | 3/2007 | Cristina et al. | |
| 2007/0153025 A1 * | 7/2007 | Mitchell | G09G 5/10 345/690 |
| 2008/0122953 A1 * | 5/2008 | Wakahara | G06T 5/10 348/241 |
| 2008/0204598 A1 | 8/2008 | Maurer | |
| 2009/0129746 A1 * | 5/2009 | Isnardi | H04N 5/913 386/252 |
| 2009/0256858 A1 * | 10/2009 | Ogikubo | G06T 11/60 345/620 |
| 2010/0157069 A1 * | 6/2010 | Sakamaki | 348/207.2 |
| 2011/0007175 A1 * | 1/2011 | Fujita et al. | 348/222.1 |

FOREIGN PATENT DOCUMENTS

| | | |
|---|---|---|
| JP | 2000-078457 A | 3/2000 |
| JP | 2005-184217 A | 7/2005 |
| JP | 2006094053 A | 4/2006 |
| JP | 2006254067 A | 9/2006 |
| JP | 2007-228167 A | 9/2007 |
| JP | 2008-011202 A | 1/2008 |
| JP | 2009-224994 A | 10/2009 |
| JP | 2009225349 A | 10/2009 |
| JP | 2010-093741 A | 4/2010 |
| JP | 2010278997 A | 12/2010 |
| RU | 2340944 C2 | 12/2008 |
| WO | 94/28490 A1 | 12/1994 |
| WO | 2008/073416 A | 6/2008 |

\* cited by examiner

FIG.9

| AREA INCLUDING CLIPPING POSITION (X,Y) | AREA INCLUDING CORRECTED CLIPPING POSITION (X',Y') |
|---|---|
| AREA 1: $0 \leq X < W/4, 0 \leq Y < H/4$ | AREA 4: X'=X+(W/4), Y'=Y+(H/4) |
| AREA 2: $W/4 \leq X < W/2, 0 \leq Y < H/4$ | AREA 3: X'=X-(W/4), Y'=Y+(H/4) |
| AREA 3: $0 \leq X < W/4, H/4 \leq Y < H/2$ | AREA 2: X'=X+(W/4), Y'=Y-(H/4) |
| AREA 4: $W/4 \leq X < W/2, H/4 \leq Y < H/2$ | AREA 1: X'=X-(W/4), Y'=Y-(H/4) |

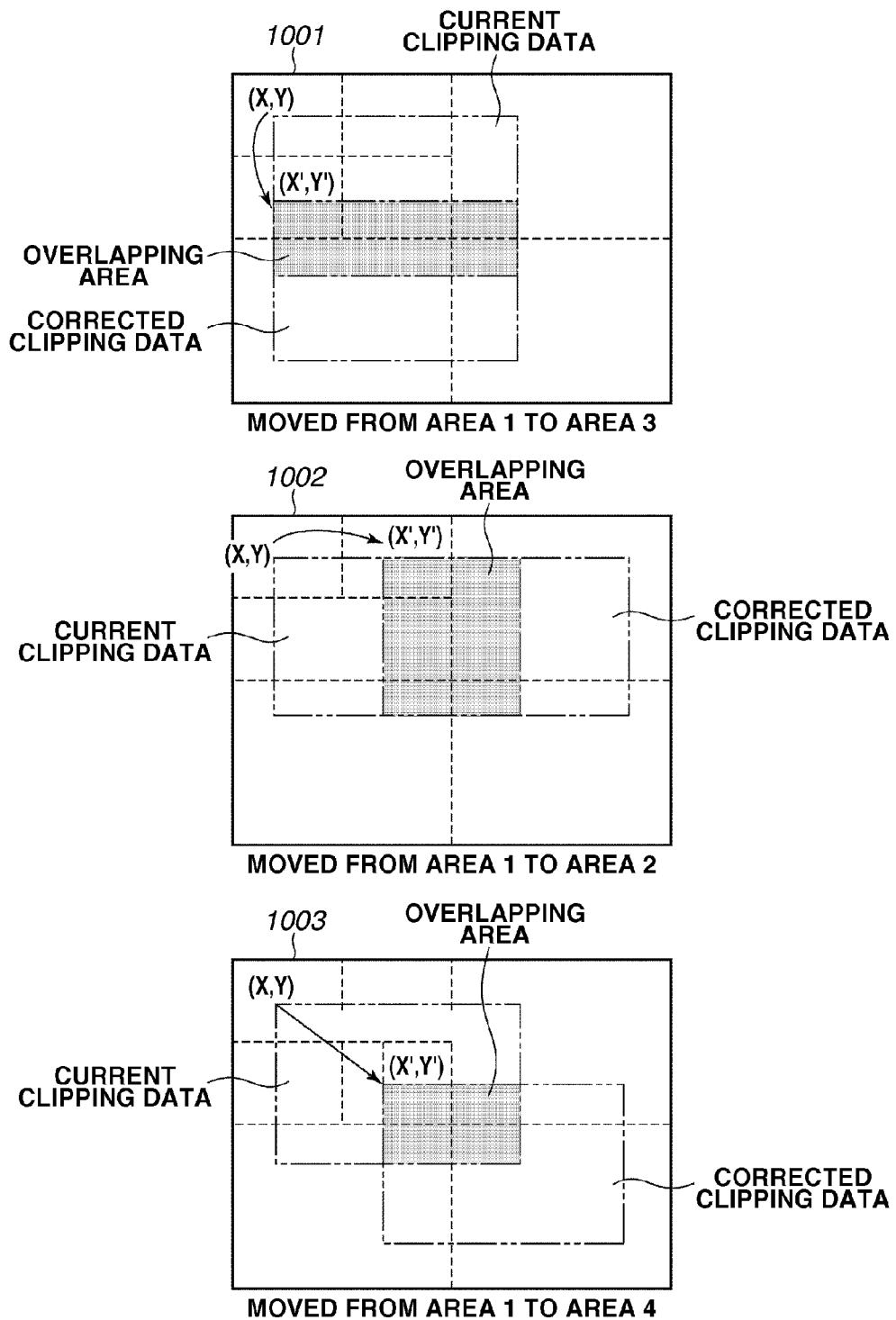

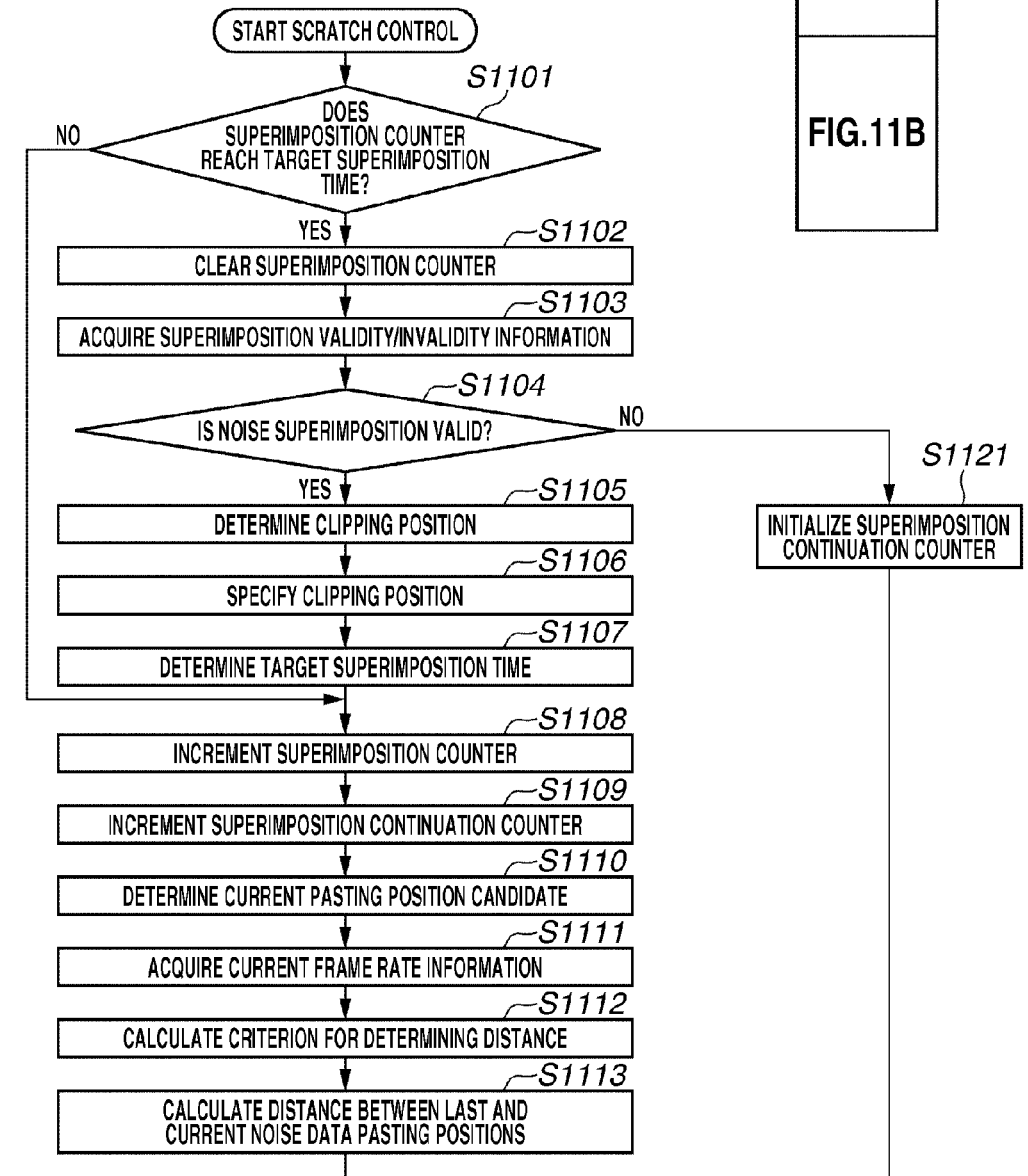

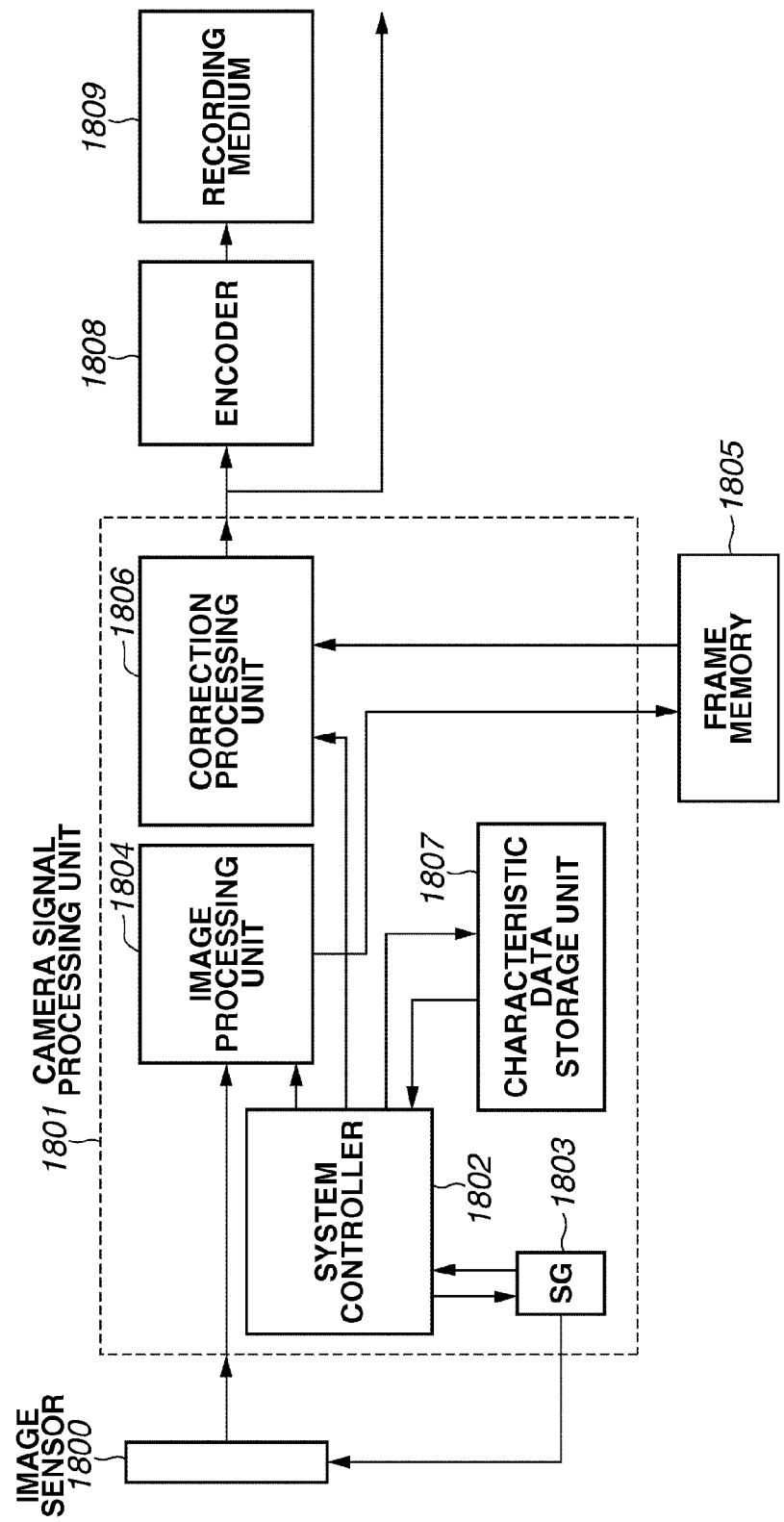

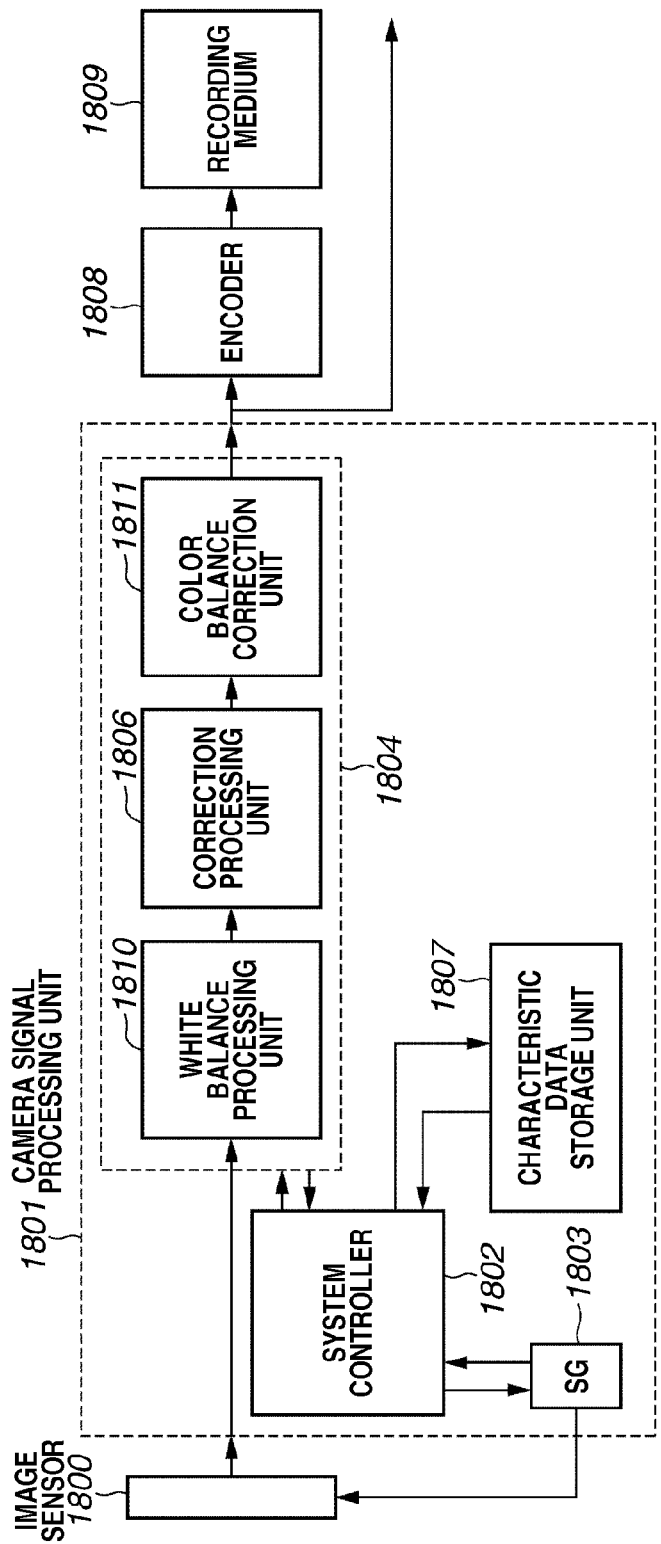

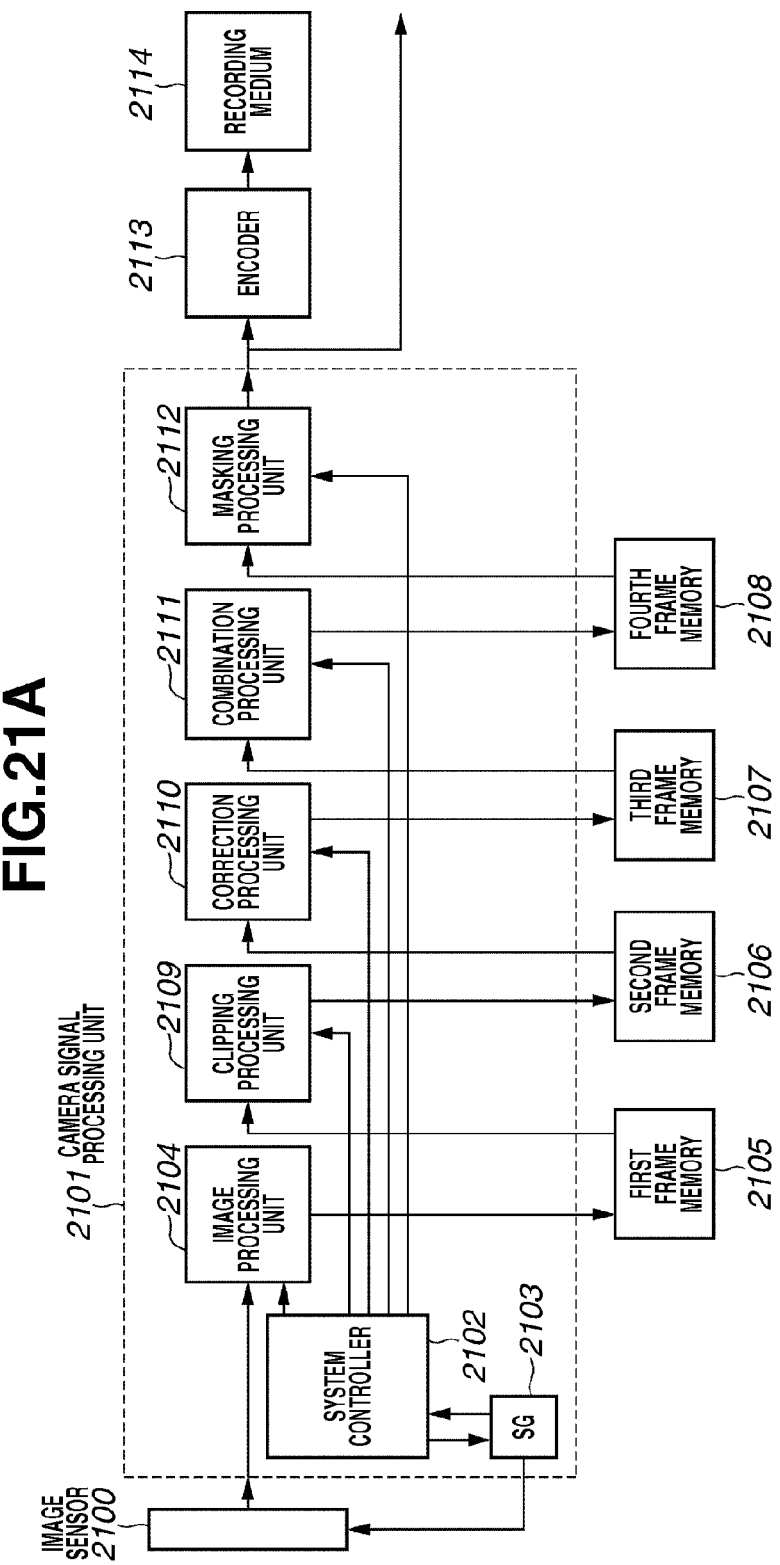

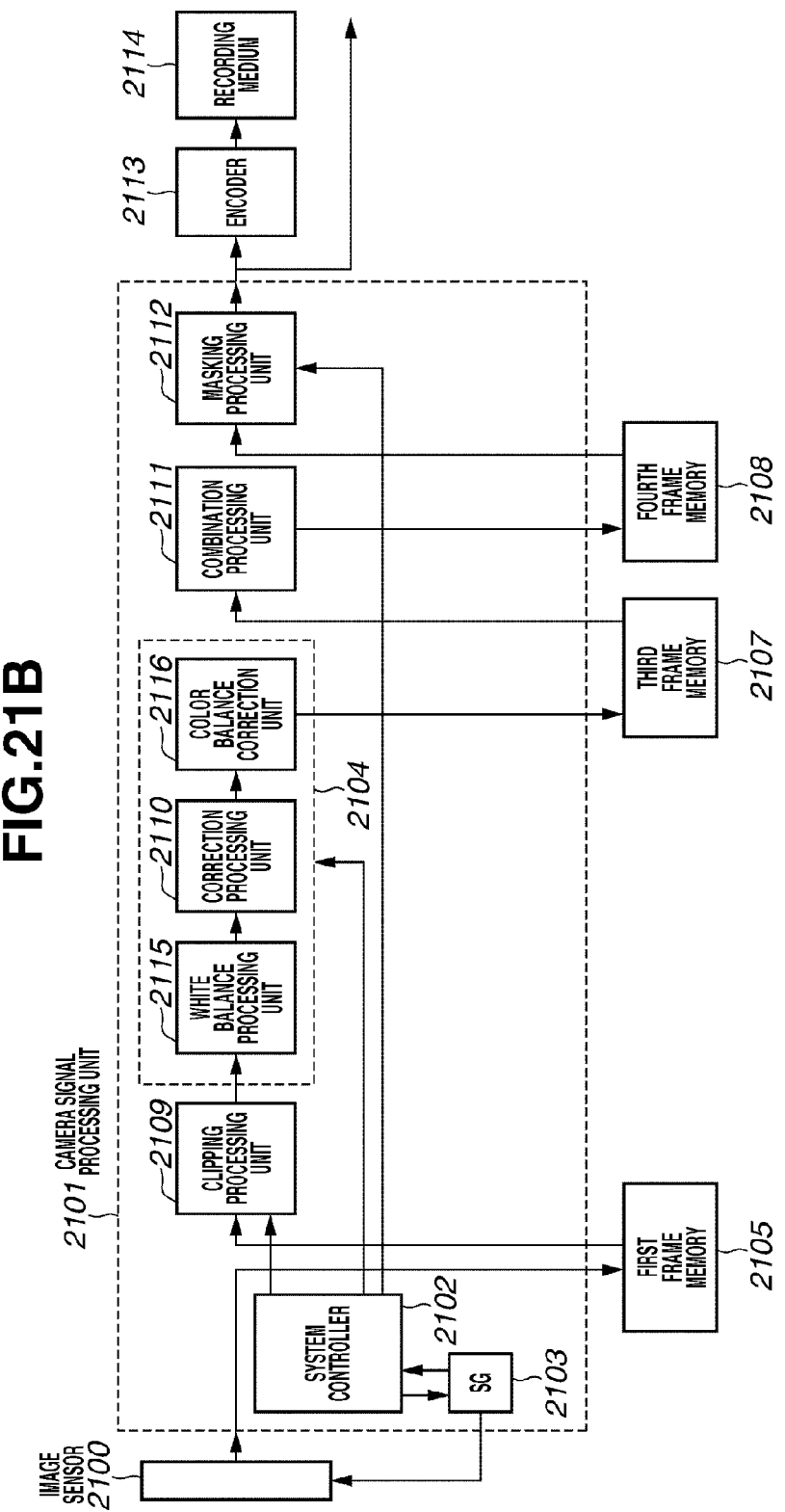

FIG.25

| PROCESS | PHENOMENA | EFFECTS | IMPLEMENTATION METHODS |
|---|---|---|---|
| (1) IMAGE CAPTURING | (A) OPTICAL CHARACTERISTIC EFFECT<br>(B) FILM CHARACTERISTIC EFFECT | (A-1) PERIPHERAL LIGHT QUANTITY REDUCTION<br>(A-2) DISTORTION<br>(B) COLOR DENSITY, CONTRAST, GRADATION, DYNAMIC RANGE | (A-1) LUMINANCE CORRECTION<br>(A-2) IMAGE DEFORMATION<br>(B) COLOR GAIN, GAMMA CHARACTERISTICS, D-RANGE CORRECTION |
| (2) DEVELOPMENT AND EDITING | (A) DEVELOPMENT TIME, DEVELOPMENT METHOD (DEVELOPMENT)<br>(B) DUST AND STAIN ADHESION (EDITING) | (A) GRAIN NOISE, SILVER RETENTION, COLOR REPRODUCTION<br>(B) NOISE | (A) GRAIN NOISE APPLICATION (COMBINATION)<br>(B) NOISE APPLICATION |
| (3) STORAGE | (A) FILM DEGRADATION DUE TO AGING<br>(B) DUST AND STAIN ADHESION | (A) COLOR FADING<br>(B) NOISE | (A) COLOR BALANCE, COLOR GAIN<br>(B) NOISE APPLICATION |
| (4) SHOWING | (A) FILM REEL ROTATIONAL FLUCTUATION<br>(B) PROJECTOR'S LIGHT SOURCE BRIGHTNESS FLUCTUATION<br>(C) SCRATCHES DUE TO DUST, ETC. | (A) VERTICAL SHAKING<br>(B) FLICKERING<br>(C) SCRATCH NOISE | (A) MEMORY CLIPPING POSITION CORRECTION<br>(B) AMPLITUDE MODULATION OF LUMINANCE<br>(C) SCRATCH NOISE APPLICATION |

IMAGE PROCESSING APPARATUS AND METHOD FOR CONTROLLING THE SAME

CROSS REFERENCE TO RELATED APPLICATIONS

The present application is a continuation of U.S. patent application Ser. No. 13/325,510, filed Dec. 14, 2011, entitled "IMAGING PROCESSING APPARATUS AND METHOD FOR CONTROLLING THE SAME", the content of which is expressly incorporated by reference herein in its entirety. Further, the present application claims priority from Japanese Patent Application No. 2010-287082, filed Dec. 24, 2010, which is also hereby incorporated by reference herein in its entirety.

BACKGROUND OF THE INVENTION

Field of the Invention

The present invention relates to an image processing apparatus configured to give film-like effects on digital image data.

Description of the Related Art

In recent years, as a method of image representation for digital cameras, there has been proposed a method for applying film-like grain effects to a captured image by combining grain noise with a digital image. Japanese Patent Application Laid-Open No. 11-085955 discusses a technique for calculating grain pattern data (original grain noise) from a film, clipping a plurality of pieces of noise data at random positions on the grain pattern data, and arranging the plurality of pieces of noise data, thus applying grain noise.

However, when a film is played back on a movie projector, the film image has not only the above-described grain noise affecting the entire image but also various phenomena.

SUMMARY OF THE INVENTION

The present invention is directed to an image processing apparatus capable of applying two types of noises having different characteristics to a captured image.

According to an aspect of the present invention, an image processing apparatus capable of applying a noise effect to input images of a plurality of frames includes a first storage unit configured to store two-dimensionally formed first noise data, a clipping unit configured to clip from the first noise, a first specification unit configured to specify a clipping position on the first noise data to be clipped by the clipping unit, a first combination unit configured to combine the noise data clipped by the clipping unit with the input image, a second storage unit configured to store second noise data, different from the first noise data, containing noise data of a plurality of patterns, a selection unit configured to select from the second noise data noise data to be pasted onto an image of a current frame, a second specification unit configured to specify a pasting position on the image of the current frame for pasting the noise data selected by the selection unit, and a second combination unit configured to combine the noise data selected by the selection unit at the position specified by the specification unit, wherein, based on a random value, the first specification unit specifies the clipping position on the first noise data, and wherein, based on a random value, the second specification unit specifies the pasting position for pasting the noise data selected by the selection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a table illustrating a corrected clipping position of the grain noise data according to the first exemplary embodiment of the present invention.

FIG. 10 illustrates the degree of duplication due to a difference between corrected positions of the grain noise data according to the first exemplary embodiment of the present invention.

FIGS. 18A and 18B are block diagrams each illustrating an example image processing apparatus according to a fourth exemplary embodiment of the present invention.

FIGS. 21A and 21B are block diagrams illustrating an example image processing apparatus according to a fifth exemplary embodiment of the present invention.

FIG. 25 is a table illustrating events affecting a showing result, effects of the events, and methods for achieving the effects through image processing on a simulation basis in each of the processes illustrated in FIG. 24.

DESCRIPTION OF THE EMBODIMENTS

Various exemplary embodiments, features, and aspects of the invention will be described in detail below with reference to the drawings.

Figure 1:
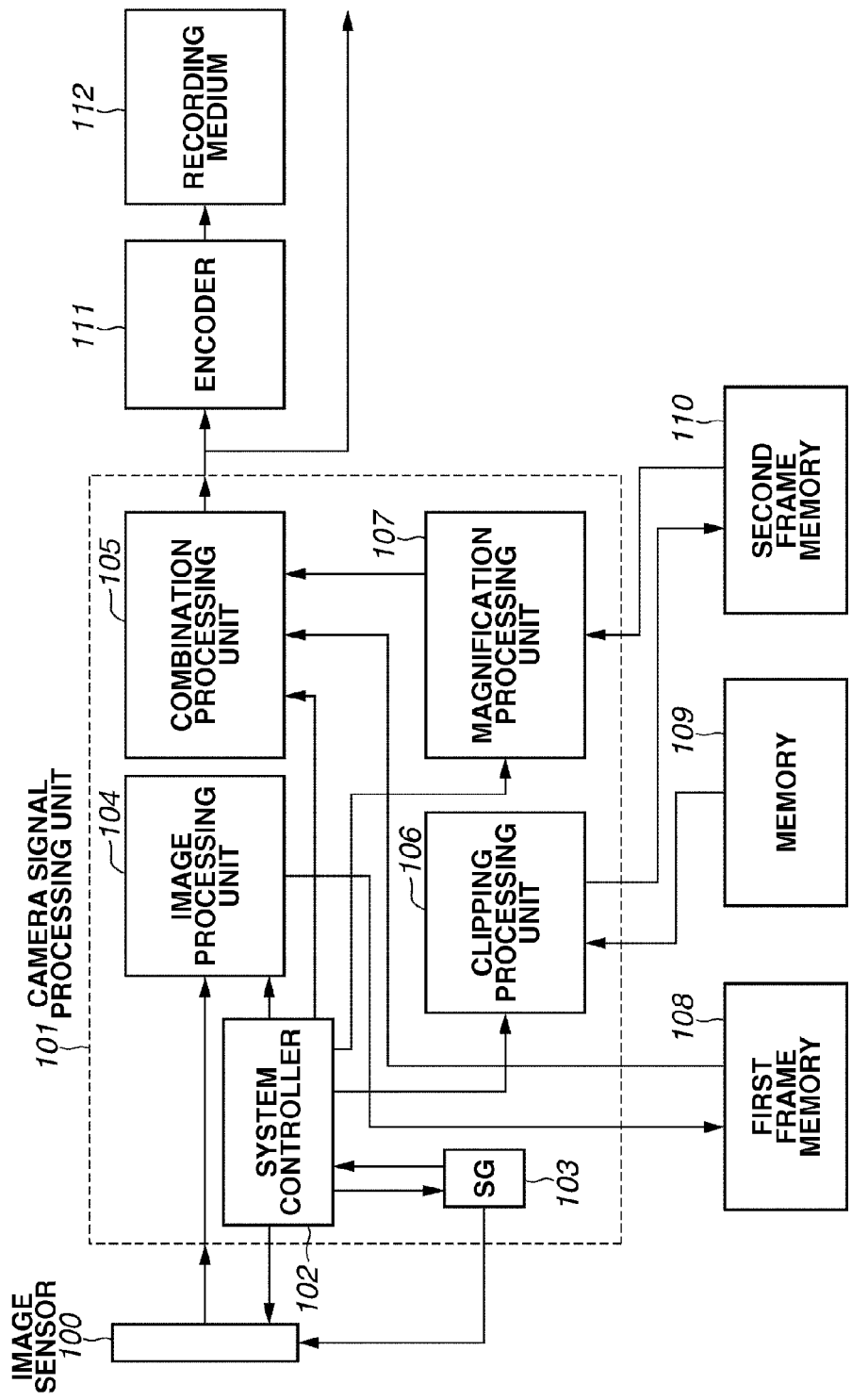
FIG. 1 is a block diagram illustrating an example image processing apparatus according to a first exemplary embodiment of the present invention.

A first exemplary embodiment will be described below based on an image processing apparatus capable of applying grain noise to a captured image to give a grain effect as a film-like noise effect. FIG. 1 is a block diagram illustrating a digital video camera as an image processing apparatus according to the first exemplary embodiment.

An image sensor 100 applies photoelectric conversion to imaging incident light. The photo-electrically converted signal is input into a camera signal processing unit 101. The camera signal processing unit 101 applies various types of image processing to the photo-electrically converted signal to convert it to a video signal, and outputs the video signal to an encoder unit 111. The encoder unit 111 encodes the video signal received from the camera signal processing unit 101 in a predetermined recording format, and records the resultant video signal to a recording medium 112.

Signal processing in the camera signal processing unit 101 will be described below. When the signal is input to the camera signal processing unit 101, an image processing unit 104 applies various types of signal processing to the signal. Various types of signal processing include white balance processing, gamma processing, color space conversion processing, color gain processing, color balance processing, applied to image data at the time of ordinary image capturing. The image processing unit 104 stores the processed signal in a first frame memory 108 as a captured image.

A memory 109 stores two-dimensional noise data 301 as a grain noise. A clipping processing unit 106 reads the noise data 301 from the memory 109, and clips noise data 302 having a predetermined position and size from the noise data 301.

Then, the clipping processing unit 106 stores the clipped noise data 302 in a second frame memory 110. A magnification processing unit 107 reads the noise data 302 from the second frame memory 110, and applies resizing processing to the noise data 302 to acquire noise data 402 having a size required for the combination with the captured image.

A combination processing unit 105 reads a captured image 401 from the first frame memory 108 and the noise data 402 from the magnification processing unit 107 at a predetermined timing, combines the captured image 401 with the noise data 402, and outputs the combined image. The combination processing unit 105 can change the combination ratio of the noise data 402 to the captured image 401. By changing the combination ratio, the combination processing unit 105 can change the intensity of grain noise to be applied to the captured image 401. A method for generating grain noise and a method for applying the grain noise will be described in detail below.

A signal generator (SG) 103 generates a signal for controlling a timing of driving the image sensor 100 and the supplies the generated signal to the image sensor 100.

A system controller 102 controls a camera block including the image sensor 100 and the camera signal processing unit 101. The system controller 102 issues to the image sensor 100 an instruction about a signal accumulation interval and a signal readout timing. The system controller 102 sets to the image processing unit 104 parameters required for image quality setting in various types of signal processing. The system controller 102 issues to the combination processing unit 105 an instruction for specifying a frame memory to be combined, an instruction for specifying the combination ratio, and an instruction about a combination timing.

The system controller 102 issues to the clipping processing unit 106 an instruction about a timing of readout from the memory 109, an instruction about a clipping position and size, and an instruction about a timing of storing clipped data in the second frame memory 110.

The system controller 102 issues to the magnification processing unit 107 an instruction about a timing of readout from the second frame memory 110 and an instruction about a size for resizing. The system controller 102 issues to the SG 103 an instruction about a timing of driving the image sensor 100.

A method for generating grain noise for giving a film-like grain effect to image data (characteristic processing of the present exemplary embodiment) and a method for applying the grain noise to image data will be described in detail below with reference to FIGS. 3 and 4.

To arrange grain pattern data in synchronization with a moving image refreshing interval, i.e., frame rate, the technique for arranging a plurality of pieces of grain pattern data discussed in Japanese Patent Application Laid-Open No. 11-085955 requires a high-speed processing system capable of arranging the pattern data in a different way each time within a frame rate period. With a method for selecting from a plurality of grain noise patterns and applying it to image data, a plurality of memory areas for storing grain noise is required.

The present exemplary embodiment, therefore, prestores grain noise as two-dimensional data, clips noise data corresponding to an entire frame of an image input at any position, and combines the clipped noise data with a moving image.

In this case, synchronizing a clipping timing with the moving image frame rate and changing the clipping position for a plurality of frames each time make it possible to combine temporally and spatially random grain noise with a moving image.

Figure 3:
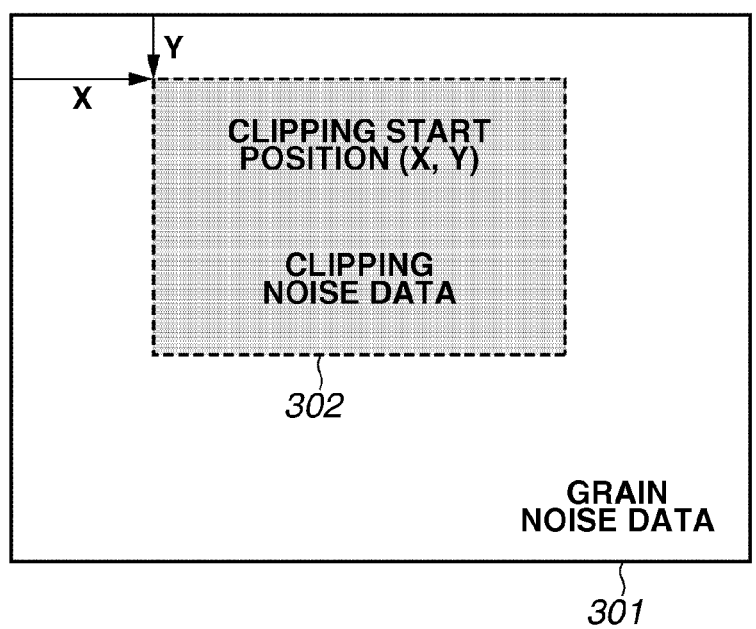
FIG. 3 illustrates grain noise data according to the first exemplary embodiment of the present invention.
Figure 4:
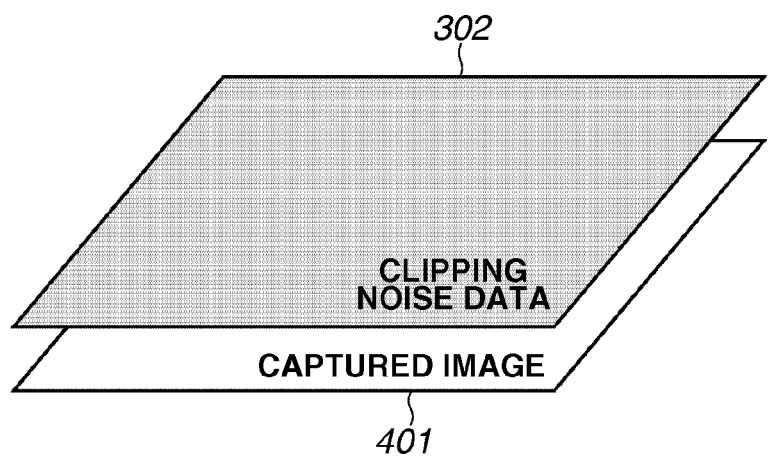
FIG. 4 illustrates a structure of a combined image of a captured image and the grain noise according to the first exemplary embodiment of the present invention.

FIG. 3 illustrates a relation between two-dimensional noise data (grain noise data 301) and the clipping noise data 302 to be clipped therefrom. FIG. 4 illustrates a concept of the combination of the clipping noise data 302 and a captured image.

The grain noise data 301 is a group of pixels each having a recorded random number according to the Gaussian distribution as a pixel value. In the present exemplary embodiment, the minimum grain unit is one pixel. The random number is not limited to random numbers according to the Gaussian distribution or any other specific types of random numbers, and may be a uniform random number, an exponential random number, and many other types of random numbers.

The form of actual noise data is not limited to specific forms, and may be image data, data sequence, and many other types. Although the minimum grain unit is not limited to one pixel, a smaller unit naturally results in higher degree of randomization.

The system controller 102 randomly determines a clipping start position (X, Y) of the grain noise data 301 by using dynamic values acquirable within a camera, such as processing time and posture and position information of a camera. The system controller 102 clips as clipping noise data 302 data having a predetermined size from the determined clipping start position on the grain noise data 301, and combines the clipping noise data 302 with a captured image, as illustrated in FIG. 4, thus applying the grain noise to the captured image.

When randomly changing the clipping start position each time, if the last and current clipping positions are close to each other, or shifted only in the horizontal or vertical direction, the two-dimensional pattern looks moving as a result of combination.

In the present exemplary embodiment, therefore, the system controller 102 sets the current clipping position so that the amount of movement from the last clipping position to the current clipping position may not fall within a predetermined range.

Figure 7:
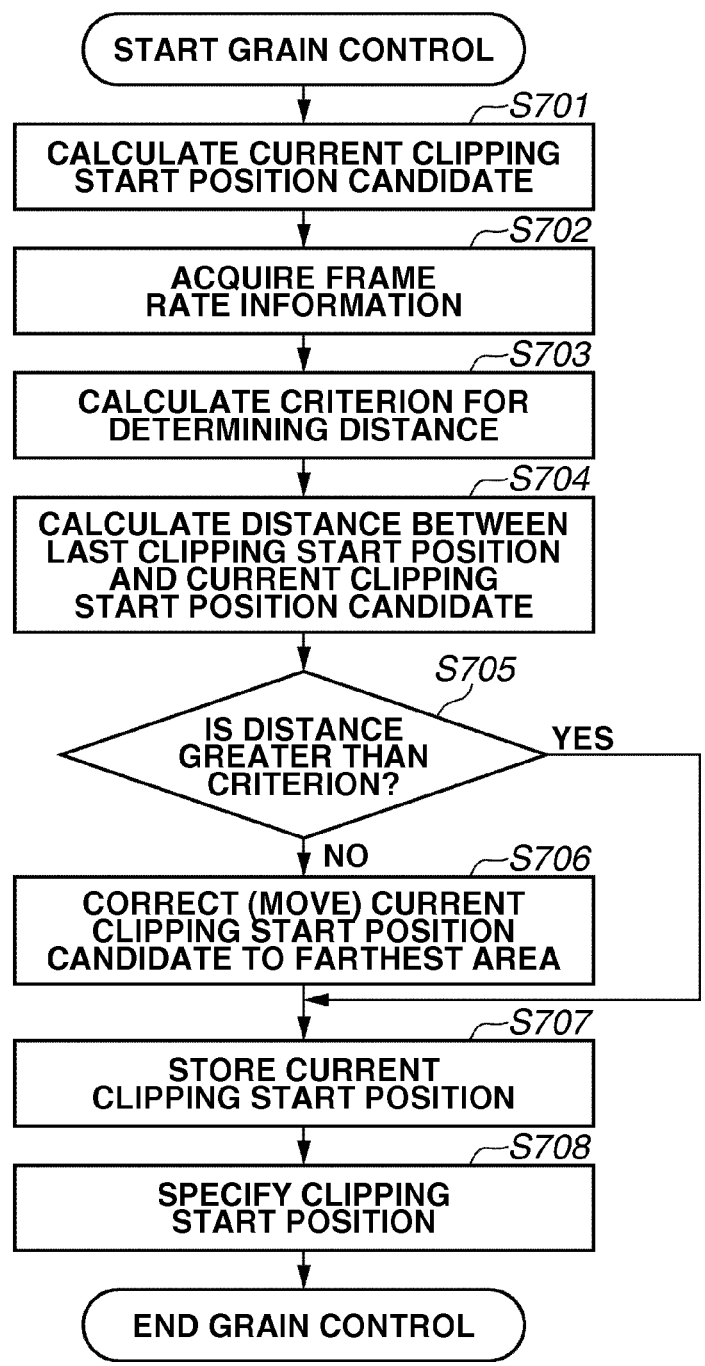
FIG. 7 is a flowchart illustrating processing for determining a clipping position of the grain noise data according to the first exemplary embodiment of the present invention.

The system controller 102 instructs the clipping processing unit 106 to apply clipping control to the noise data 301. The clipping control according to the present exemplary embodiment will be described below with reference to FIG. 7. The above-described clipping control is performed in an image capturing mode in which a film-like noise effect is applied to a captured image. Alternatively, the clipping control is performed as post-processing after successive moving image readout from a memory such as a recording medium 212.

In step S701, the system controller 102 calculates a candidate position from which clipping is to be started this time (hereinafter referred to as current clipping start position or current clipping position) by using the above-described dynamic values from the noise data stored in the memory 109. To combine the clipped data as grain noise, the system controller 102 randomly determines each time a current clipping position different from the last clipping position. Upon completion of determination of a current clipping position to be specified, the processing proceeds to step S702.

In step S702, the system controller 102 acquires frame rate information of the current image sensor 100 based on a drive timing signal to be specified to the SG 103. Upon completion of acquisition of the frame rate information, the processing proceeds to step S703.

In step S703, the system controller 102 calculates a criterion for determining how far the currently specified clipping position (hereinafter referred to as current clipping position) is from the last clipping position stored in a temporary memory (not illustrated).

The system controller 102 refreshes the grain noise to be combined in synchronization with the frame rate. Therefore, the smaller the frame rate, i.e., the longer the captured image refreshing interval, the longer the grain noise refreshing interval becomes, i.e., the longer the grain noise remains visible. Therefore, when the last and current clipping positions are close to each other, the combined grain noise looks moving.

According to the frame rate information acquired in step S702, the system controller 102 changes the criterion (predetermined value) for determining how near the current clipping position is from the last clipping position. For example, with a frame rate of 60 fps (first frame rate), when the current clipping position is within 10 pixels (first predetermined value) around the last clipping position, the current position is determined to be near the last position.

On the other hand, with a frame rate of 30 fps (second frame rate), the system controller 102 determines a criterion so that, when the current clipping position is within 20 pixels (second predetermined value) around the last clipping position, the current position is determined to be near the last position (the distance therebetween is equal to or less than a predetermined value). Upon completion of determination of the criterion, the processing proceeds to step S704.

In step S704, the system controller 102 calculates a distance (change amount) on the grain noise between the last clipping position on the noise data and the current clipping position thereon calculated in step S701. Upon completion of calculation of the distance, the processing proceeds to step S705.

In step S705, the system controller 102 compares the distance between the last clipping position calculated in step S704 and the current clipping position with the criterion calculated in step S703. When the distance is greater than the criterion (YES in step S705), i.e., when the system controller 102 determines that the clipping position has largely changed from the last clipping position, the processing proceeds to step S707. On the other hand, when the distance is smaller than the criterion (NO in step S705), i.e., when the system controller 102 determines that clipping position has slightly changed from the last clipping position, the processing proceeds to step S706.

In step S706, the system controller 102 corrects position information of the currently specified clipping position calculated in step S701. A method for correcting the position information of the clipping position will be described below. Upon completion of correction of the clipping position information, the processing proceeds to step S707.

In step S707, the system controller 102 stores in the temporary memory the position information of the clipping position corrected in step S706 for use in the next clipping position control, and the processing proceeds to step S708. In step S708, the system controller 102 specifies the clipping position corrected in step S706 to the clipping processing unit 106, and the processing ends.

Figure 8:
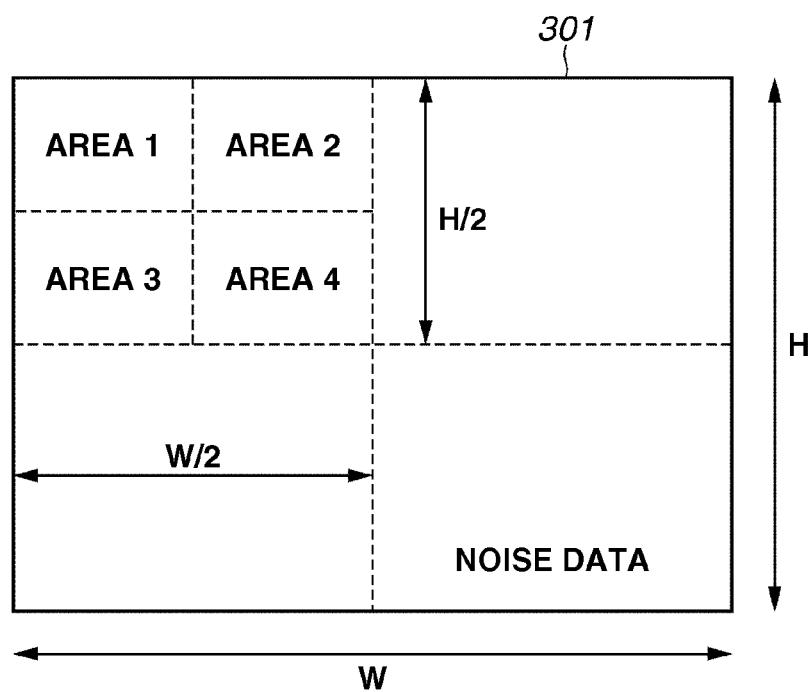
FIG. 8 illustrates the clipping position of the grain noise data according to the first exemplary embodiment of the present invention.

The processing for correcting the clipping position in step S706 will be described below. FIGS. 8, 9, and 10 illustrate correction conditions and correcting positions when correcting the clipping position of the noise data 301 stored in the memory 103.

The noise data 301 has a width of W pixels and a height of H pixels (W≥4, H≥4). Clipping of the noise data 301 will be performed on a pixel basis, using the top left position as the origin (0, 0) of clipping position. The clipping noise data 302 to be clipped has a width of (W/2) pixels and a height of (H/2) pixels.

For example, as illustrated in FIG. 3, when the current clipping position is (X, Y), the clipping start position (X, Y) for starting clipping the clipping noise data 302 having the above-described size can be specified within a range (0≤X<W/2, 0≤Y<Y/2) (FIG. 8).

This range within which the clipping start position can be specified is divided into four areas 1, 2, 3, and 4 illustrated in FIG. 8. The area 1 has a clipping start position within a range (0≤X<W/4, 0≤Y<H/4). The area 2 has a clipping start position within a range (W/4≤X<W/2, 0≤Y<H/4). The area 3 has a clipping start position within a range (0≤X<W/4, H/4≤Y<H/2). The area 4 has a clipping start position within a range (W/4≤X<W/2, H/4≤Y<H/2).

When correcting the clipping position, it is desirable that there is a small overlapping area between the noise data clipped at the last clipping position and the noise data clipped at the current clipping position, and that the two positions are separated. This state will improve the degree of randomization at the time of combination.

In correction control, the system controller 102 determines where in the areas 1 to 4 the current clipping position exists, and corrects the current clipping position to a position in a diagonal area of the determined area. In this case, as illustrated in the table in FIG. 9, the system controller 102 corrects the clipping start position (X, Y) to a corrected clipping position (X', Y').

For example, when the current clipping position exists in the area 1, moving the current clipping position to the area 4 (noise data 1003 in FIG. 10) provides a smaller overlapping area of clipped noise data than moving it to the areas 2 and 3 (noise data 1001 and 1002 in FIG. 10, respectively). This prevents the movement of noise data from being easily noticed, improving the temporal degree of randomization of the grain noise.

As described above, in the first exemplary embodiment, the system controller 102 randomly clips a range of the two-dimensional noise data, and combines the clipped noise data with the captured image each time the captured image is refreshed. This method enables applying the grain noise even to a moving image.

Even when a randomly determined clipping position is close to the last clipping position, i.e., within a predetermined range, the above-described method corrects the determined clipping position to a position out of the predetermined range, ensuring a certain degree of noise randomization. The present exemplary embodiment enables generating noise data simply by clipping a piece of data having a predetermined size from data already having been read, providing a shorter time period required for noise data generation than the technique discussed in Japanese Patent Application Laid-Open No. 11-085955.

The present exemplary embodiment further compares the current clipping position with the last clipping position and, when the difference between the two positions is small, i.e., the two positions are close to each other, changes the current clipping position to prevent the clipped noise data from looking moving, thus improving the degree of noise randomization.

In the present exemplary embodiment, the grain noise data 301 has a width of W pixels and a height of H pixels, and the clipping noise data has a width of W/2 pixels and a height of H/2 pixels. However, the size of the clipping noise data for the grain noise data is not limited thereto but may be greater or smaller than that in the present exemplary embodiment as long as it does not exceeds the size of the grain noise data.

However, increasing the size of the clipping noise data may lower the degree of randomization. On the other hand, decreasing the size thereof may increase the ratio of the size of the grain noise data 301 to the size of the required clipping noise data and consume a greater memory capacity.

Accordingly, in the present exemplary embodiment, the ratio of the size of the grain noise data 301 to the size of the clipping noise data is set to about 4, and control is performed so that the last and current clipping start positions do not become close to each other, thus preferably ensuring a certain degree of noise randomization and saving the memory capacity.

Although, in the present exemplary embodiment, the range within which the clipping start position can be specified is divided into four areas, the number and assignment of division areas are not limited thereto.

In the present exemplary embodiment, when the system controller 102 determines that the distance between the current and last clipping positions is equal to or less than a predetermined value, the system controller 102 corrects the area including the above-described clipping start position to other areas. However, the method for correcting the clipping start position is not limited thereto. The clipping start position may be moved so that the distance between the current and last clipping positions becomes greater than the predetermined value.

More specifically, when the predetermined value is 10 pixels around the last clipping position with a frame rate of 60 fps, the current clipping position (coordinate) may be changed to 11 or more pixels therearound. Alternatively, coordinates of less than 10 pixels around the last clipping position may be excluded from candidates, and the current start position may be randomly specified.

In the present exemplary embodiment, when the system controller 102 determines that the distance between the current and last clipping positions is equal to or less than a predetermined value, the system controller 102 corrects the area including the above-described clipping start position to other areas. However, the method for correcting the clipping start position is not limited thereto. It may be possible to determine which of the areas 1, 2, 3, and 4 in FIG. 8 the current and last clipping positions belong to and, when they belong to the same area, move the current clipping position to a different area.

In this case, as in the present exemplary embodiment, it is preferable to move the current clipping position to a diagonal area, to minimize the overlapping area between the current and last clipping areas. Further, with the combination of this determination method with the method for determining whether the distance between the current and last clipping positions is equal to or less than a predetermined value, an effective determination can be made even when the clipping start position exists in the vicinity of the boundary of the two areas.

Figure 5:
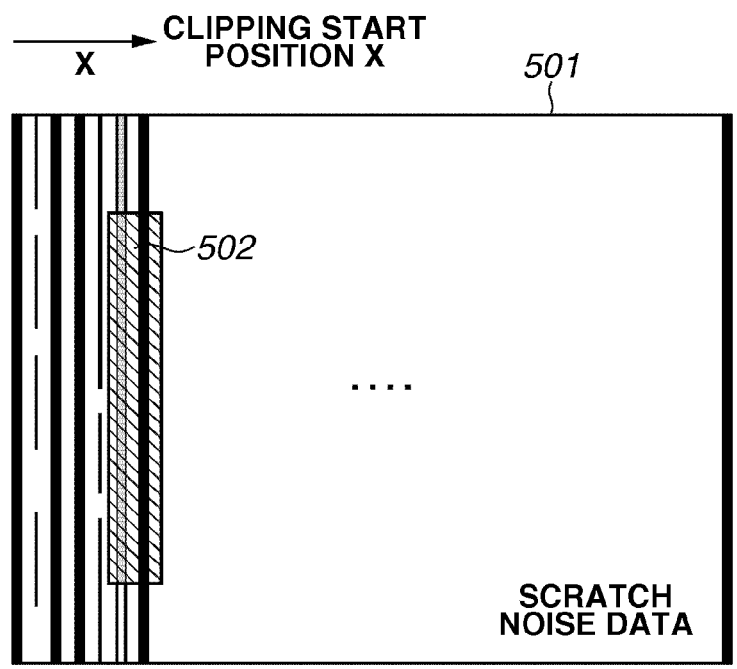
FIG. 5 illustrates scratch noise data according to the second exemplary embodiment of the present invention.
Figure 6:
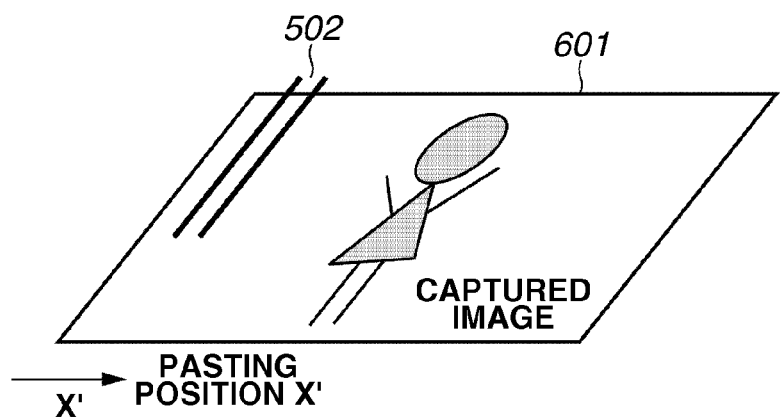
FIG. 6 illustrates a structure of a combined image of a captured image and the scratch noise data according to the second exemplary embodiment of the present invention.

A second exemplary embodiment will be described below based on an image processing apparatus capable of applying scratches (vertical linear noise) to apply to the captured image a film-like effect of scratches on the film. FIGS. 5 and 6 describe the clipping and combination of scratch noise data according to the present exemplary embodiment.

FIG. 5 illustrates scratch noise data 501 containing scratches of a plurality of patterns, and a relation with noise data 502 to be clipped therefrom. With the scratch noise data 501, the intensity is determined by a random number considering one pixel as a minimum unit in the horizontal direction and scratches are stored in the vertical direction.

The intensity changes considering a plurality of pixels as a minimum unit in the vertical direction and, accordingly, the density and thickness of scratches change in the vertical direction, thus representing "fading" of scratches. The random number may be one according to the Gaussian distribution and many other types, but not limited to specific types.

FIG. 6 illustrates a concept of the combination of clipped scratches and the captured image. In the present exemplary embodiment, the system controller 102 clips the clipping noise data 502 from the scratch noise data 501 as illustrated in FIG. 5, and resizes the clipped noise data 502 to a predetermined image size to generate pasting noise data 602. Then, according to the pasting position of the last pasting noise data 602 and the continuation time of pasting at that position, the system controller 102 determines a pasting position of the pasting noise data 602, and pastes it at that position on the captured image.

Figure 2:
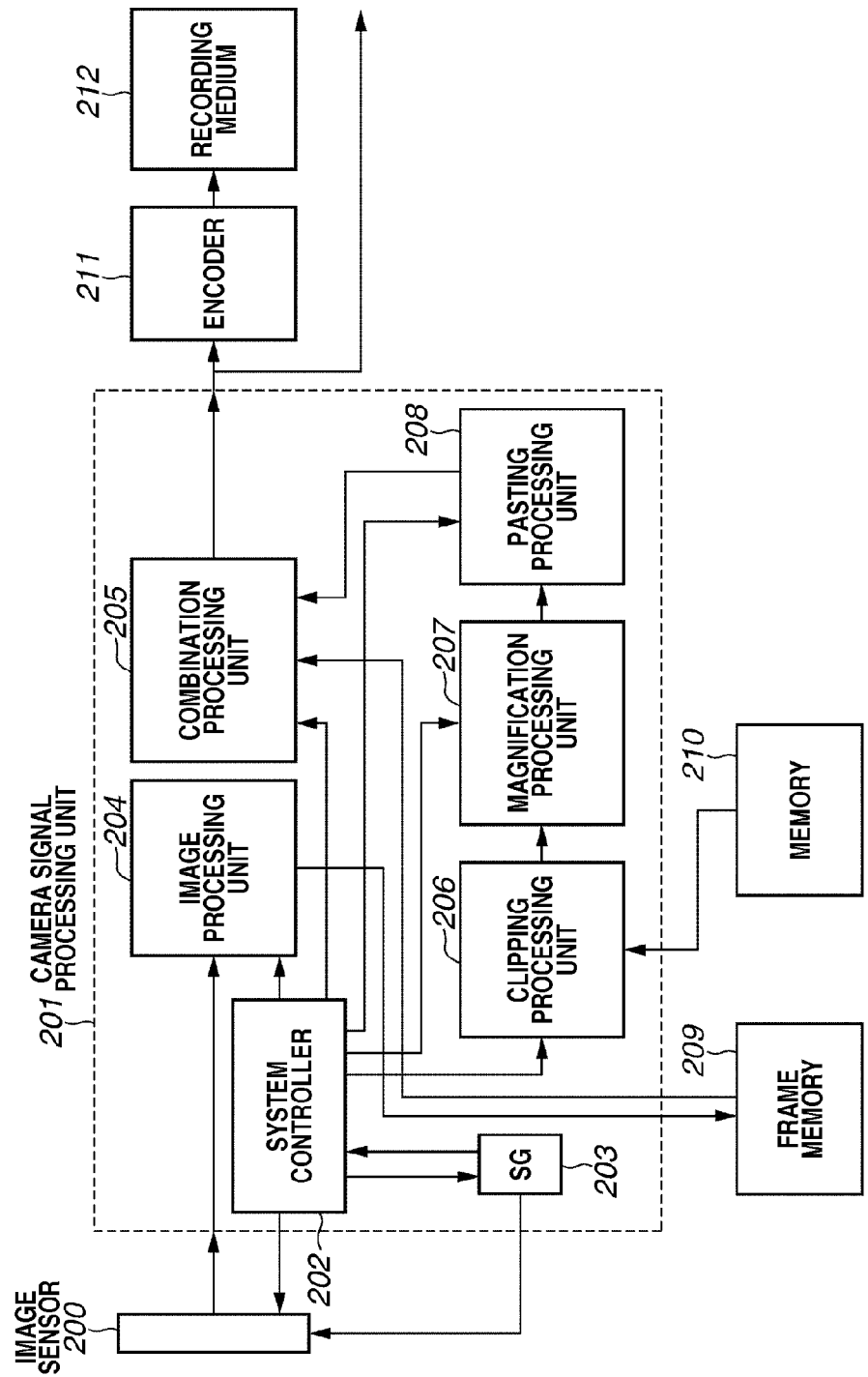
FIG. 2 is a block diagram illustrating an example image processing apparatus according to a second exemplary embodiment of the present invention.

FIG. 2 is a block diagram illustrating a digital video camera as an image processing apparatus according to the second exemplary embodiment. An image sensor 200 performs photoelectric conversion on imaging incident light. A photo-electrically converted signal is input into a camera signal processing unit 201.

The camera signal processing unit 201 applies various types of image processing to the photo-electrically converted signal to convert it into a video signal, and outputs the video signal to an encoder unit 211. The encoder unit 211 encodes the video signal received from the camera signal processing unit 201 in a predetermined recording format, and records the resultant video signal to a recording medium 212.

Signal processing in the camera signal processing unit 201 will be described below. When the signal is input to the camera signal processing unit 201, an image processing unit 204 applies various types of signal processing to the signal similar to the first exemplary embodiment. The image processing unit 204 stores the processed signal in a frame memory 209 as a captured image.

The memory 210 stores the scratch noise data 501 having scratches of a plurality of patterns. A clipping processing unit 206 reads the noise data 501 from a memory 210.

The clipping processing unit 206 clips the scratch noise data 502 having a specified size and a specified position on the noise data 501. A magnification processing unit 207 resizes the clipped noise data 502 into the noise data 602 having a size required for the combination with the captured image 601. A pasting processing unit 208 specifies a pasting position for combining the noise data 602 with the captured image 601 at any position not depending on the clipping position.

A combination processing unit 205 reads the captured image 601 from the frame memory 209 and the noise data 602 from the pasting processing unit 208 at a predetermined timing, combines the captured image 601 with the noise data 602, and outputs the combined image.

An SG 203 generates a signal for controlling a timing of driving the image sensor 200 and the supplies the generated signal to the image sensor 200 and a system controller 202.

The system controller 202 controls a camera block including the image sensor 200 and the camera signal processing unit 201. The system controller 202 issues to the image sensor 200 an instruction about a signal accumulation interval and a signal readout timing. The system controller 202 sets to the image processing unit 204 parameters required for image quality setting in various types of signal processing.

The system controller 202 issues to the combination processing unit 205 an instruction for specifying a frame memory to be combined, an instruction for specifying the combination ratio, and an instruction about a combination timing. To generate scratches, the system controller 202 issues to the clipping processing unit 206 an instruction about a timing of readout from the memory 210 and an instruction about a clipping position and size.

The system controller 202 issues to the magnification processing unit 207 an instruction about a size for resizing. The system controller 202 issues to the pasting processing unit 208 an instruction about a pasting position for combination. The system controller 202 issues to the SG 203 an instruction about a timing of driving the image sensor 200.

Figure 11B:
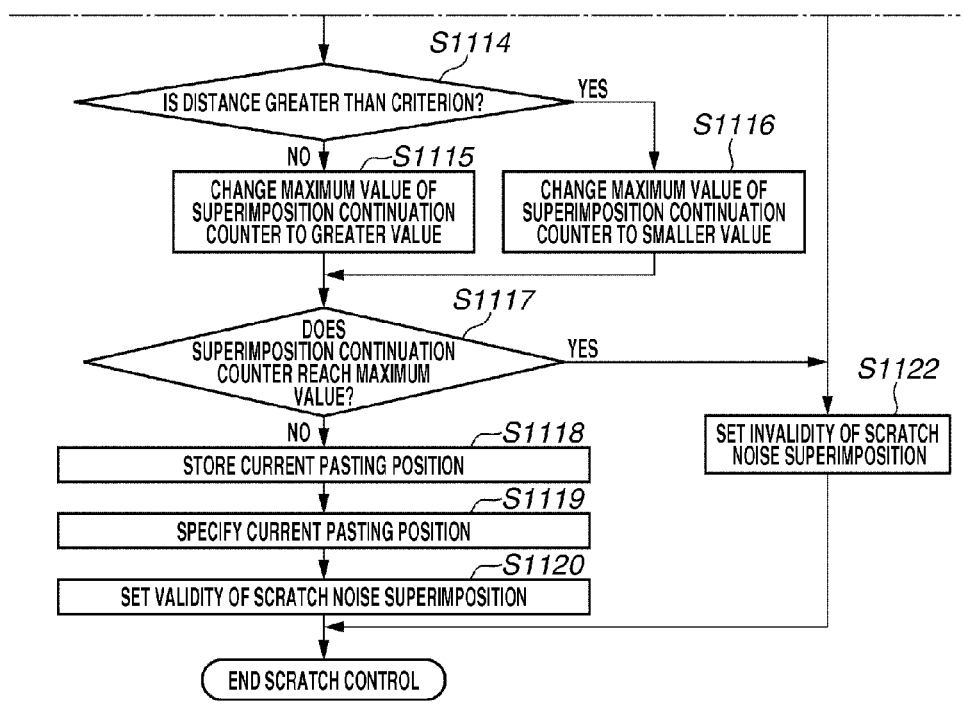
FIG. 11 (including 11A and 11B) is a flowchart illustrating processing for determining a pasting position of the scratch noise data according to the second exemplary embodiment of the present invention.

The system controller 202 according to the present exemplary embodiment instructs the pasting processing unit 208 to apply pasting control to the pasting noise data 602. The pasting control will be described below with reference to FIG. 11 (including 11A and 11B) and 12.

The above-described pasting control is performed in an image capturing mode in which image processing for applying an effect of scratches to the captured image is performed. Alternatively, the pasting control is also performed as post-processing after successive moving image readout from a memory such as a recording medium 212. This processing is started in synchronization with a vertical synchronization signal and a series of processing is repeated by the vertical synchronization signal.

In step S1101, the system controller 202 determines whether the value of a superimposition counter (first detection unit), a counter for measuring a time period during which scratches stored in a temporary memory (not illustrated) are superimposed onto the captured image, has reached a target superimposition time (first predetermined time period). When the value has not reached the target superimposition time (NO in step S1101), the processing proceeds to step S1108.

On the other hand, when the value has reached the target superimposition time (YES in step S1101), the processing proceeds to step S1102. The target superimposition time refers to a time period during which identical scratches may be continuously displayed onto the captured image. The target superimposition time may be determined depending on various conditions or by a user. In step S1102, the system controller 202 initializes the superimposition counter having reached the target superimposition time, and the processing proceeds to step S1103.

In step S1103, the system controller 202 acquires information about whether the scratches clipped from the noise data stored in the memory 210 are to be superimposed this time (hereinafter this information is referred to as superimposition validity/invalidity information). For example, to randomly superimpose the scratches, the system controller 202 may acquire a value at random from a random number generation unit as the superimposition validity/invalidity information. Upon completion of acquisition of the superimposition validity/invalidity information, the processing proceeds to step S1104.

In step S1104, the system controller 202 determines whether the superimposition validity/invalidity information acquired in step S1103 specifies scratch noise superimposition. The system controller 202 stores the result of determination in the temporary memory. The superimposition validity/invalidity information may be defined by a binary value.

For example, when the value acquired from the random number generation unit is greater than a predetermined threshold value, the system controller 202 determines the validity of superimposition. On the other hand, when the value is equal to or less than the threshold value, the system controller 202 determines the invalidity of superimposition.

Figure 12:
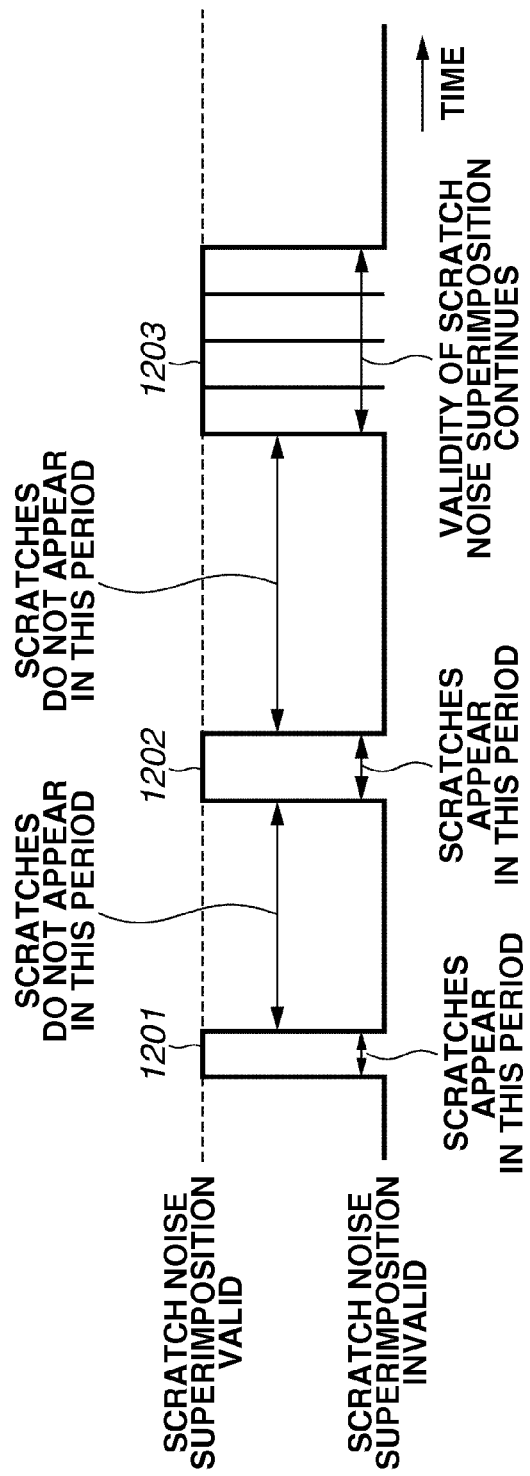
FIG. 12 illustrates temporal change of necessity in scratch application according to the second exemplary embodiment of the present invention.

In terms of temporal change, executing the processing in step S1104 randomly generates a period with superimposition and a period without superimposition for each predetermined frame, as illustrated in FIG. 12. In the present exemplary embodiment, the system controller 202 determines the validity or invalidity of superimposition for each frame.

When the system controller 202 determines the validity of superimposition (YES in step S1104), the processing proceeds to step S1105. On the other hand, when the system controller 202 determines the invalidity of superimposition (NO in step S1104), the processing proceeds to step S1121.

In step S1105, the system controller 202 determines a clipping start position, width, and height of the clipping noise data 502 to be clipped from the scratch noise data 501 stored in the memory 210.

Changing these values changes patterns (length, intensity, number of scratches, etc.) of the scratches to be superimposed. Therefore, these values (start position, width, and height) may be determined by using the random number generation unit so that clipping is started from a different position each time. Upon completion of calculation of a clipping position, the processing proceeds to step S1106.

In step S1106, the system controller 202 specifies the clipping position determined in step S1105 to the clipping processing unit 206, and the processing proceeds to step S1107. In step S1107, the system controller 202 determines a target superimposition time, and saves it in the temporary memory, and the processing proceeds to step S1108.

In step S1108, the system controller 202 increments the superimposition counter, and the processing proceeds to step S1109. In step S1109, to measure an elapsed time since the time when scratch superimposition is determined to be validated from the invalid state, the system controller 202 increments the superimposition continuation counter (second detection unit), and the processing proceeds to step S1110.

In step S1110, the system controller 202 determines a pasting position on the currently captured image from which the noise data clipped by the clipping processing unit 206 is to be pasted. The pasting position is randomly determined depending on the timing of combination.

For example, if a pasting position is acquired by using the random number generation unit, the scratches are superimposed at a different position on the screen each time combination is made, and the resultant data looks like random noise. Upon completion of acquisition of a pasting position, the processing proceeds to step S1111.

In step S1111, the system controller 202 acquires the current frame rate information for the image sensor 200 based on the drive timing signal specified for the SG 203. Upon completion of acquisition of the current frame rate information, the processing proceeds to step S1112.

In step S1112, the system controller 202 calculates a criterion (predetermined value) for determining how far the current pasting position is from the last pasting position. The system controller 202 refreshes the scratches to be combined in synchronization with the frame rate. Therefore, the smaller the frame rate, i.e., the longer the captured image refreshing interval is, the longer the scratch noise refreshing interval, i.e., the longer the scratch noise remains visible becomes.

If the distance between the current and last pasting positions is large, the combined scratches look moving. Accordingly, according to the frame rate information acquired in step S1111, the system controller 202 changes the criterion for determining how far the current clipping position is from the last clipping position.

For example, with a frame rate of 60 fps (first frame rate), when the current pasting position is longitudinally or horizontally farther by more than 10 pixels (first predetermined value) from the last pasting position, the current position is determined to be far therefrom (the distance therebetween is greater than the predetermined value). On the other hand, with a frame rate of 30 fps (second frame rate), the system controller 202 changes the criterion so that, when the current pasting position is longitudinally or horizontally farther by more than 20 pixels (second predetermined value) from the last pasting position, the current position is determined to be far from therefrom (the distance therebetween is greater than the predetermined value). Upon completion of determination of the criterion, the processing proceeds to step S1113.

In step S1113, the system controller 202 calculates a distance between the last noise data pasting position and the current noise data pasting position calculated in step S1110. Upon completion of calculation of the distance, the processing proceeds to step S1114.

In step S1114, the system controller 202 compares the distance between the two pasting positions calculated in step S1113 with the criterion calculated in step S1113. When the distance is greater than the criterion (predetermined value) (YES in step S1114), i.e., when the system controller 202 determines that the pasting position has largely changed from the last pasting position, the processing proceeds to step S1116. On the other hand, when the distance is equal to or less than the criterion (NO in step S1114), i.e., when the system controller 202 determines that the pasting position has slightly changed from the last pasting position, the processing proceeds to step S1115.

In step S1115, the system controller 202 changes the predetermined maximum value of the superimposition continuation counter (second predetermined time period) to a greater value. Upon completion of maximum value change, the processing proceeds to step S1117.

In step S1116, the system controller 202 changes the predetermined maximum value of the superimposition continuation counter to a smaller value. Upon completion of maximum value change, the processing proceeds to step S1117.

In step S1117, the system controller 202 compares the maximum value of the superimposition continuation counter with the value of the superimposition continuation counter stored in the temporary memory. When the superimposition continuation counter has reached the maximum value (YES in step S1117), the processing proceeds to step S1122. On the other hand, when superimposition continuation counter has not reached the maximum value (NO in step S1117), the processing proceeds to step S1118. In step S1118, the system controller 202 stores the determined current pasting position in the temporary memory for use in the next pasting position control. Upon completion of storage of the current pasting position, the processing proceeds to step S1119.

In step S1119, the system controller 202 specifies the current pasting position to the pasting processing unit 208. Upon completion of specification of the current pasting position, the processing proceeds to step S1120. In step S1120, the system controller 202 specifies the validation of scratch superimposition onto the captured image to the combination processing unit 205. Upon completion of validation of superimposition, the processing ends the scratch control.

In step S1121, the system controller 202 initializes the value of the superimposition continuation counter, and stores it in the temporary memory. Upon completion of storage of the superimposition continuation counter, the processing proceeds to step S1122.

In step S1122, the system controller 202 specifies the invalidation of scratch superimposition onto the captured image to the combination processing unit 205. Superimposition may be invalidated by any method, for example, by outputting only the captured image without performing the combination processing, or by performing the combination processing with a lowered combination ratio of the scratches to the captured image, and outputting only the captured image. Upon completion of invalidation of superimposition, the processing ends the scratch control.

In the second exemplary embodiment, the system controller 202 randomly clips from any position noise data containing scratches of a plurality of patterns (prestored in a storage unit) each time the captured image is refreshed, and combines the clipped noise data with the captured image. This makes it possible to generate temporally and spatially random scratch noise and apply moving scratches to a moving image.

Further, when scratch application continues more than a fixed time period, the system controller 202 compares the current pasting position with the last pasting position. In this case, limiting scratch application to a far position (having a large positional movement) enables achieving an operation close to actual scratch noise generation.

In the above-described first and the second exemplary embodiments, the system controllers 102 and 202 change the grain noise clipping position and invalidate scratch application by changing grain noise change conditions and scratch invalidity conditions depending on the moving image frame rate.

However, a small combination ratio of the noise data makes it difficult to recognize the noise component in the combined image. Therefore, in grain noise clipping control, it is difficult to recognize that the noise pattern is moving even if the current clipping position is close to the last clipping position.

It goes without saying that, if the combination ratio of the noise data to the captured image can be changed by the user or automatically, conditions can be changed according to the combination ratio of the noise data. Specifically, the smaller the combination ratio of the noise data to the captured image is, the greater the predetermined value can be.

The first and second exemplary embodiments have specifically been described based on a case where grain noise and scratches are applied in a moving image capturing operation of a digital video camera.

However, the present invention is not limited to moving image capturing, and may also be used to apply a different grain noise pattern at each image capturing in the continuous image capturing mode in still image capturing. It goes without saying that, the present invention can be used to apply a film-like effect in moving image or still image reproduction.

Figure 14:
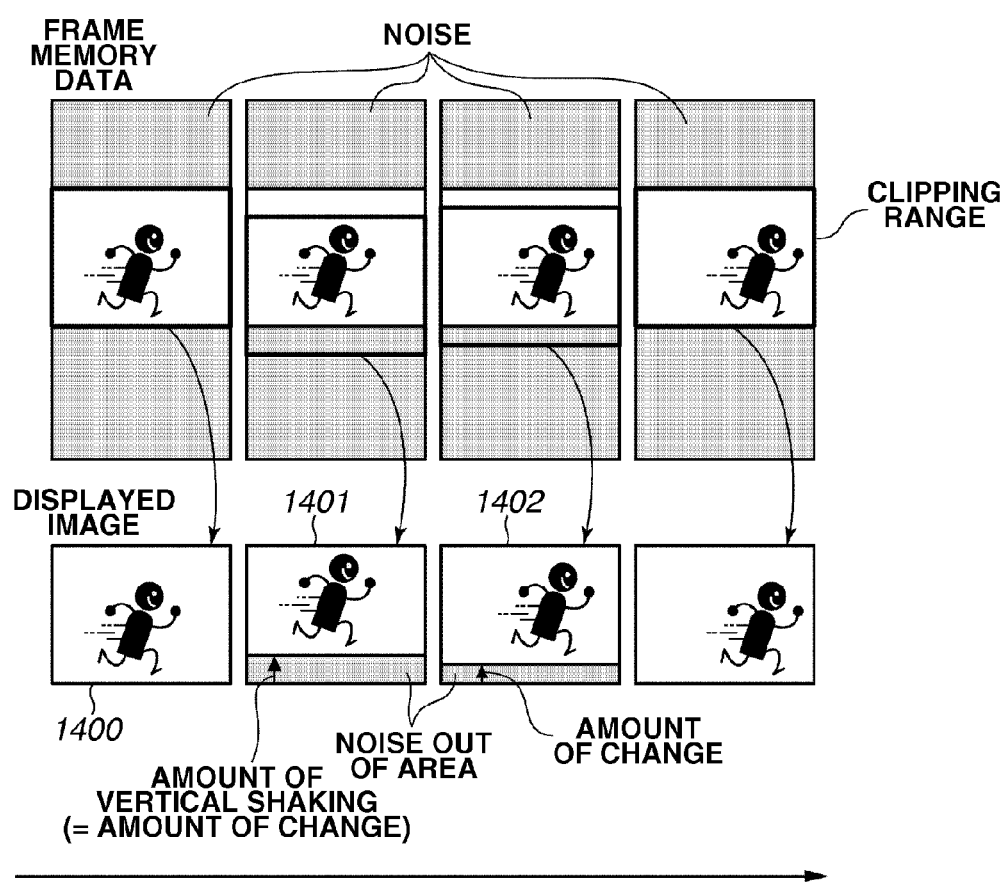
FIG. 14 illustrates a frame memory and image clipping therefrom according to the third exemplary embodiment and an image of the present invention.
Figure 15:
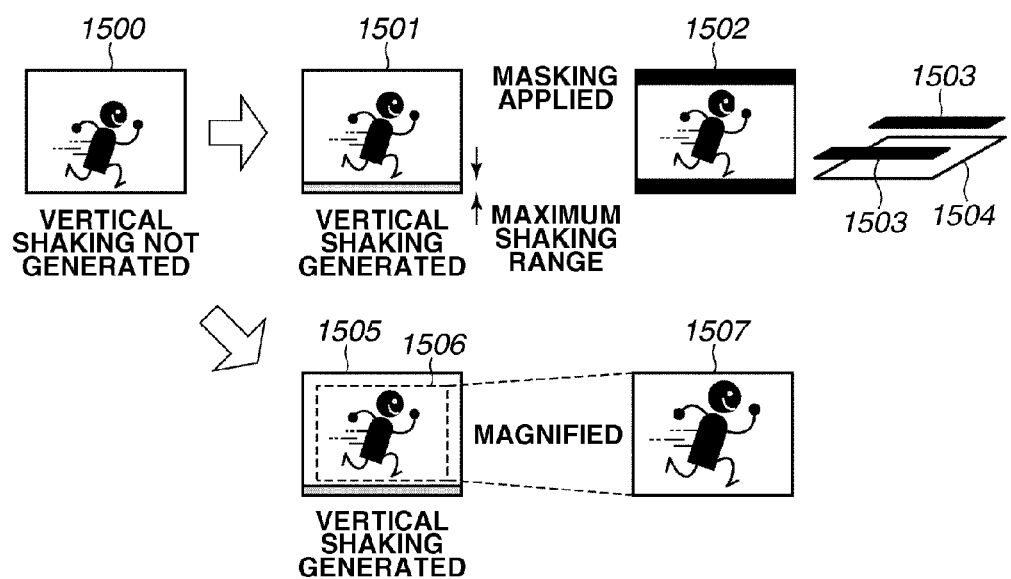
FIG. 15 illustrates processing for hiding noise due to image clipping according to the third exemplary embodiment of the present invention.

A third exemplary embodiment will be described below based on an image processing apparatus capable of applying to the captured image a film-like effect of vertical image shaking generated when a film is played back on a movie projector. FIGS. 14 and 15 describe processing for achieving vertical shaking according to the present exemplary embodiment, i.e., processing for clipping an image from a frame memory and hiding noise (data without image information) due to image clipping.

FIG. 14 illustrates a data structure in the frame memory storing an image captured by an image sensor, and an image displayed when the frame memory data is clipped at a specified position. The frame memory data is refreshed in succession. Although data for another use is stored in areas before and after the captured image, the data can be regarded as noise data (data without image information) for the captured image data.

The captured image stored in the frame memory is clipped from a predetermined clipping start position over a predetermined clipping range, and output as a display image 1400. Determining the clipping start position by using a random number enables clipping an image at a different position each time, and outputting the captured image with vertical shaking like display images 1401 and 1402.

The clipping start position is determined considering one pixel of an image in the vertical direction (one line) as a minimum unit. The random number for determining the clipping start position may be any random number according to the Gaussian distribution and many other types, but not limited to specific types.

Shaking exceeding a predetermined amount is prevented from occurring by providing a maximum value of an offset amount from a reference position to the clipping start position. The reference position is based on a state where the amount of vertical shaking is zero.

The offset amount is a sum of two amounts of vertical shaking determined at different intervals. A readout start position of the image shifted from the top left end by the offset amount is set as the clipping start position. Thus, it becomes possible to represent vertical shaking as a combination of different types of shaking, such as vertical shaking generated by the film advance operation and vertical shaking generated by the film take-up operation.

FIG. 15 illustrates a method for hiding noise data generated when a vertical shaking effect is applied. With a captured image 1500, no vertical shaking is generated. With captured images 1501 and 1505, arbitrary vertical shaking is generated, and noise data is displayed at the bottom of the screen. The noise data can be hidden possibly by applying a masking image or magnifying the captured image.

The method of applying a masking image superimposes a masking image 1503 having a size exceeding the maximum shaking range (maximum offset amount) of vertical shaking onto a captured image 1504 at the bottom of the screen, thus hiding the noise data. In this case, superimposing also at the top of the screen a masking image having the same size enables displaying a captured image 1502 having a so-called letter box aspect ratio.

On the other hand, a method of magnifying a captured image magnifies an area 1506 not including the maximum shaking range of vertical shaking so that the height of the area 1506 coincides with the screen height while maintaining the aspect ratio of the screen. Thus, the area 1506 can be displayed as a display image 1507.

Figure 13:
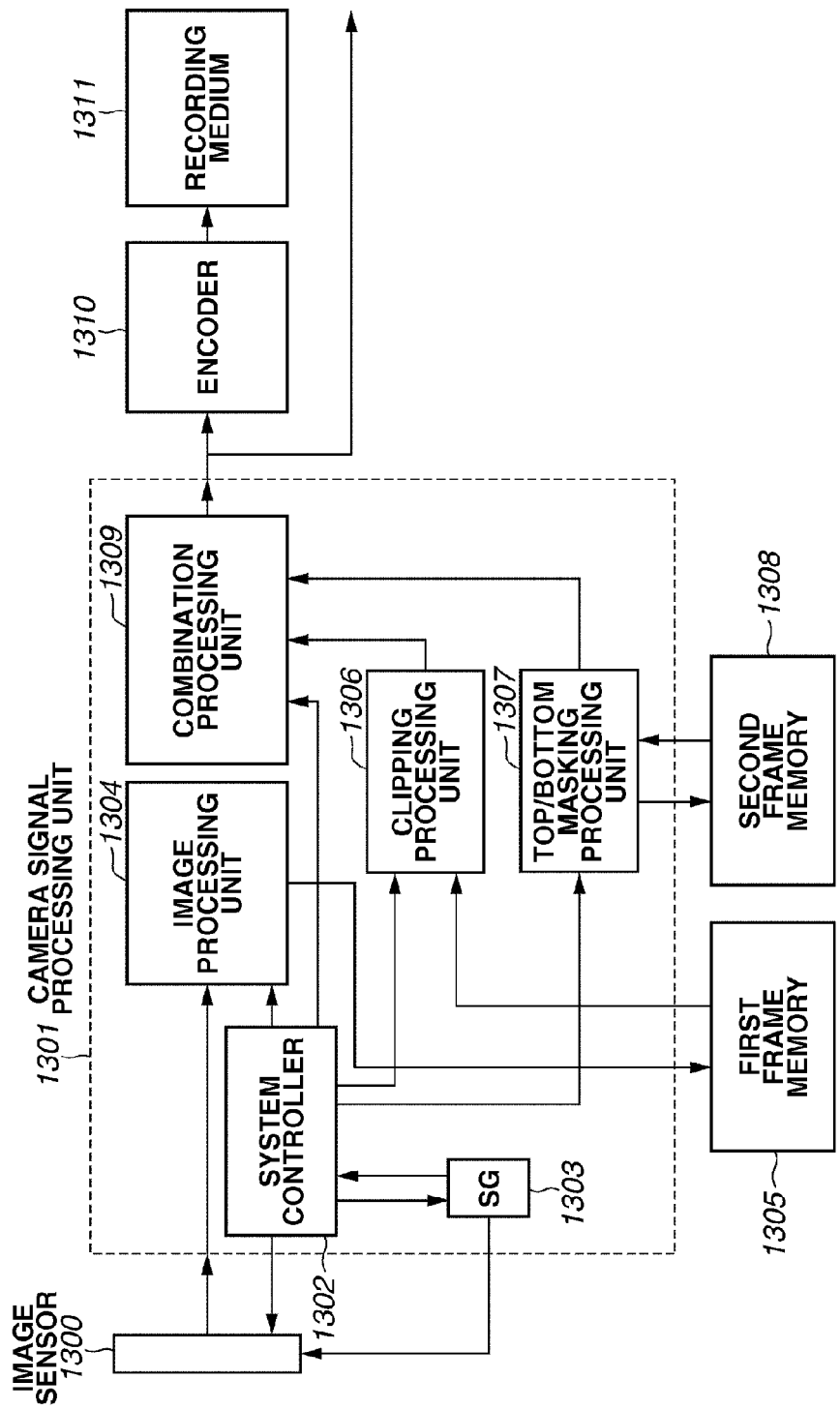
FIG. 13 is a block diagram illustrating an image processing apparatus according to a third exemplary embodiment of the present invention.

FIG. 13 is a block diagram illustrating a digital video camera as an image processing apparatus according to the third exemplary embodiment.

An image sensor 1300 applies photoelectric conversion to image-forming incident light. The photo-electrically converted signal is input into a camera signal processing unit 1301. The camera signal processing unit 1301 applies various types of image processing to the photo-electrically converted signal to convert it into a video signal and outputs the video signal to an encoder unit 1310. The encoder unit 1310 encodes the video signal received from the camera signal processing unit 1301 in a predetermined recording format, and records the resultant video signal to a recording medium 1311.

Signal processing in the camera signal processing unit 1301 will be described below. When the signal is input into the camera signal processing unit 1301, an image processing unit 1304 applies various types of signal processing to the signal similarly to the first exemplary embodiment. The image processing unit 1304 stores the processed signal in a first frame memory 1305 as a captured image.

To give an effect of vertical shaking, a clipping processing unit 1306 clips arbitrary position by using a predetermined maximum value of offset amount from the first frame memory 1305. The second frame memory 1308 stores a masking image for hiding noise data generated by the clipping processing. A masking processing unit 1307 generates masking image having a size exceeding the maximum vertical shaking range, and stores it in the second frame memory 1308.

A combination processing unit 1309 reads at a predetermined timing the captured image 1504 stored in the first frame memory 1305 and the masking image 1304 generated by the masking processing unit 1307 and stored in the second frame memory 1308, combines the captured image 1504 with the masking image 1304, and outputs the combined image.

An SG 1303 generates a signal for controlling a timing of driving the image sensor 1300, and the supplies the generated signal to the image sensor 1300 and a system controller 1302.

The system controller 1302 controls a camera block including the image sensor 1300 and the camera signal processing unit 1301. The system controller 1302 issues to the image sensor 1300 an instruction about a signal accumulation interval and a signal readout timing. The system controller 1302 sets to the image processing unit 1304 parameters required for image quality setting in various types of signal processing.

The system controller 1302 issues to the combination processing unit 1309 an instruction for specifying a frame memory to be combined and an instruction about a combination timing. The system controller 1302 issues to the clipping processing unit 1306 an instruction about a timing of readout from the first frame memory 1305 and an instruction about a clipping position.

The system controller 1302 issues to the masking processing unit 1307 an instruction about the size and color of a masking image to be superimposed, and an instruction for starting and canceling a relevant operation. The system controller 1302 issues to the SG 1303 an instruction about a timing of driving the image sensor 1300.

Figure 16:
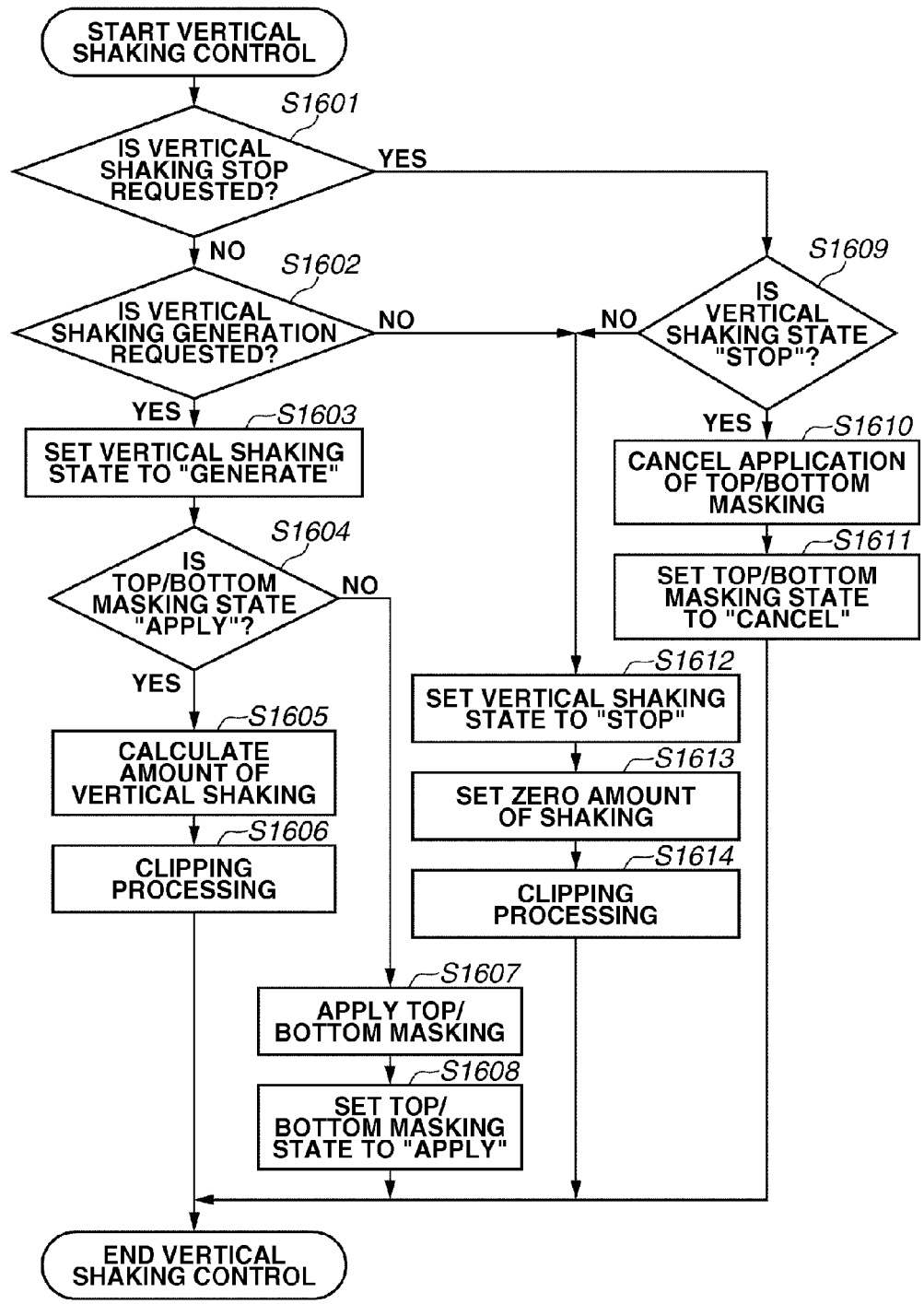
FIG. 16 is a flowchart illustrating processing for applying vertical shaking processing according to the third exemplary embodiment of the present invention.

The system controller 1302 according to the present exemplary embodiment instructs the clipping processing unit 1306 and the masking processing unit 1307 to respectively perform clipping processing and masking processing for the captured image. The flowchart of the processing will be described below with reference to FIGS. 16 and 17.

The above-described clipping and masking control is performed in an image capturing mode in which image processing for applying an effect of vertical shaking to the captured image is performed. Alternatively, the clipping and masking control is also performed as post-processing after successive moving image readout from a memory such as a recording medium 1311.

This processing is started in synchronization with a vertical synchronization signal, and a series of processing is repeated by the vertical synchronization signal. In the present exemplary embodiment, whether or not vertical shaking is applied can be manually selected by the user or automatically through scene determination.

To apply vertical shaking, masking and vertical shaking are applied in this order to prevent the noise data from being viewed. To cancel application of vertical shaking, vertical shaking is stopped and then masking is canceled.

In step S1601, the system controller 1302 determines whether vertical shaking stop is requested. When vertical shaking stop is requested (YES in step S1601), the system controller 1302 acquires an operation state such as image capturing mode information and, when it detects that an image capturing mode requiring vertical shaking has changed to an image capturing mode not requiring vertical shaking, issues a vertical shaking stop request, and the processing proceeds to step S1609. On the other hand, when vertical shaking stop is not requested (NO in step S1601), the processing proceeds to step S1602.

In step S1602, the system controller 1302 determines whether vertical shaking generation is requested. When vertical shaking generation is requested (YES in step S1602), the system controller 1302 acquires an operation state such as image capturing mode information and, when it detects that an image capturing mode not requiring vertical shaking has changed to an image capturing mode requiring vertical shaking, issues a vertical shaking generation request, and the processing proceeds to step S1603. On the other hand, when vertical shaking generation is not requested (NO in step S1602), the processing proceeds to step S1612.

In step S1603, the system controller 1302 sets the vertical shaking state to "GENERATE". Vertical shaking control is possible when the vertical shaking state is "GENERATE". Upon completion of vertical shaking state setting, the processing proceeds to step S1604. In step S1604, the system controller 1302 determines the masking state to be added on the top/bottom of the captured image. When the system controller 1302 determines that the vertical masking state is "APPLY" (YES in step S1604), the processing proceeds to step S1605. On the other hand, when the system controller 1302 determines that the top/bottom masking state is "CANCEL" (NO in step S1604), the processing proceeds to step S1607.

In step S1605, the system controller 1302 calculates an amount of vertical shaking. The amount of shaking is randomly determined, and may be determined, for example, by assigning a value acquired from the random number generation unit to the following formula:

$$X = X\mathrm{max} \times (r/R)$$

where X indicates the amount of shaking, Xmax indicates the maximum amount of shaking, r indicates a value acquired from the random number generation unit, and R indicates the maximum value output by the random number generation unit.

As described above, a plurality of shaking types can be combined. For example, a combination of first and second shaking is assumed. The first shaking changes at short intervals and has a small amount of shaking. The second shaking changes at long intervals and has a large amount of shaking.

Figure 17:
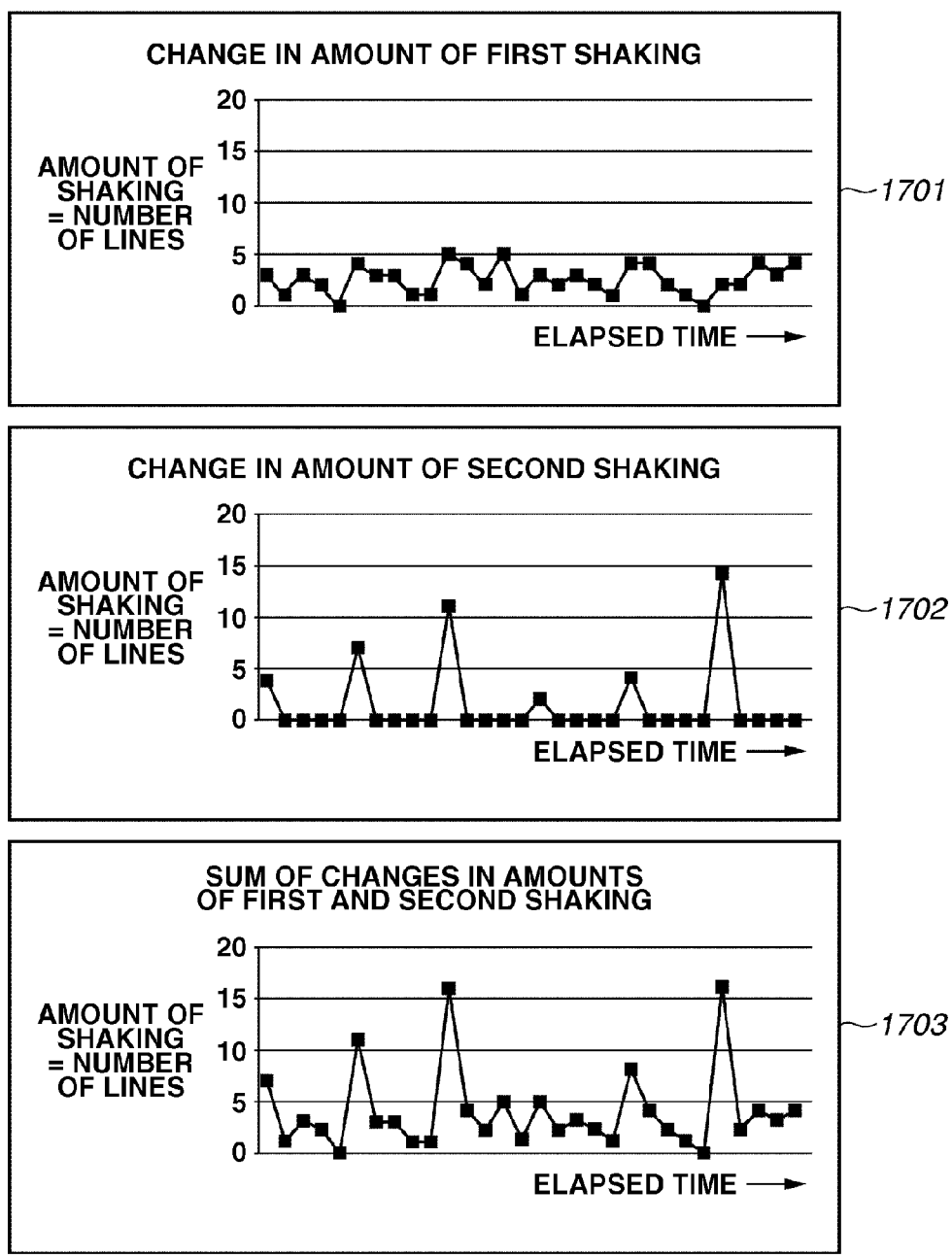
FIG. 17 illustrates a plurality of shaking types and a combination thereof used for the vertical shaking processing according to the third exemplary embodiment of the present invention.

FIG. 17 illustrates a temporal change in the amount of first shaking 1701, a temporal change in the amount of second shaking 1702, and a combination (sum) of temporal changes in amounts of first and second shaking 1703.

In this case, the amount of shaking X may be determined by applying the following formula to values obtained by the random number generation unit.

$$X = X\max1 \times (r1/R1) + X\max2 \times (r2/R2)$$

where Xmax1 denotes a maximum amount of shaking in the change in the amount of first shaking, Xmax2 denotes a maximum amount of shaking in the change in the amount of second shaking, r1 and r2 respectively denote the amounts of first and second shaking obtained from the random number generation unit, and R1 and R2 denote maximum values output by the random number generation unit.

Upon completion of determination of the amount of shaking in step S1605, the processing proceeds to step S1606. In step S1606, the system controller 1302 calculates a clipping start position of the captured image stored in the frame memory based on the amount of shaking determined in step S1605. Upon completion of calculation of the clipping start position, the processing of the vertical shaking control ends.

In step S1607, the system controller 1302 instructs the masking processing unit 1307 to apply a masking image for hiding the noise data at the bottom of the screen appearing when vertical shaking is generated. In this case, the system controller 1302 notifies information about the size of the masking image to the masking processing unit 1307. Upon completion of application of the masking image, the processing proceeds to step S1608. In step S1608, the system controller 1302 sets the masking state to "APPLY", and the processing of the vertical shaking control ends.

In step S1609, the system controller 1302 determines the vertical shaking state. When the masking state is "STOP" (YES in step S1609), the processing proceeds to step S1610. On the other hand, when the masking state is "GENERATE" (NO in step S1609), the processing proceeds to step S1612.

In step S1610, the system controller 1302 instructs the masking processing unit 1307 to cancel application of the masking image for hiding the noise data at the bottom of the screen appearing when vertical shaking is generated. The system controller 1302 notifies superimposition invalidity information for invalidating masking image superimposition to the masking processing unit 1307. Upon completion of specification of the invalidation of superimposition, the processing proceeds to step S1611. In step S1611, the system controller 1302 sets the masking state to "CANCEL", and the processing of the vertical shaking control ends.

In step S1612, the system controller 1302 sets the vertical shaking state to "STOP". When the vertical shaking state is "STOP", the vertical shaking control is invalidated. Upon completion of vertical shaking state setting, the processing proceeds to step S1613. In step S1613, the system controller 1302 sets a value without vertical shaking as the amount of shaking. Upon completion of determination of the amount of shaking, the processing proceeds to step S1614. In step S1614, the system controller 1302 calculates a clipping start position of the captured image stored in the frame memory based on the amount of shaking determined in step S1613. In this case, the calculated clipping start position serves as a reference position. Upon completion of calculation of the clipping start position, the processing of the vertical shaking control ends.

The above-described steps will be considered below for each situation. (1) When vertical shaking addition is started, since vertical shaking generation is requested but vertical shaking stop is not, the processing proceeds to steps S1601, S1602, S1603, and S1604 in this order. Since the initial top/bottom masking state is "CANCEL" (NO in step S1604), the processing proceeds to steps S1607 and S1608. In step S1607, the system controller 1302 applies top/bottom masking. In step S1608, the system controller 1302 changes the top/bottom masking state to "APPLY", and the processing of the first sequence ends.

In the next frame, the processing proceeds to step S1604. In step S1604, since the top/bottom masking state is "APPLY" (YES in step S1604), the processing proceeds to steps S1605 and S1606. In steps S1605 and then S1606, the system controller 1302 generates vertical shaking.

Subsequently, (2) application of vertical shaking is continued when the system controller 1302 repeats the processing in steps S1601 to S1606 for each frame. (3) Application of vertical shaking ends when the system controller 1302 determines that vertical shaking stop is requested but vertical shaking generation is not. In this case, the processing proceeds to step S1609 from step S1601.

In the first sequence, since the vertical shaking state is "GENERATE", the processing proceeds to step S1612. In step S1612, the system controller 1302 sets the vertical shaking state to "STOP". In steps S1613 and S1614, the system controller 1302 stops vertical shaking. In the next frame, the processing proceeds to steps S1601 and S1609. In step S1609, since the vertical shaking state is "STOP", the processing proceeds to step S1610. In step S1610, the system controller 1302 cancels top/bottom masking and sets the top/bottom masking state to "CANCEL", and the processing of the second sequence ends. This completes application of vertical shaking.

(4) A state where vertical shaking is not applied is continued when the system controller 1302 determines that neither vertical shaking stop nor vertical shaking generation is requested. In this case, the processing proceeds to steps S1601 to S1602, and S1612. In Steps S1613 and S1614, the system controller 1302 performs clipping at a clipping position without the amount of shaking to produce a state without vertical shaking. Continuing this loop retains a state without vertical shaking.

As described above, in the third exemplary embodiment, displaying an image clipped at a randomly determined clipping start position enables applying to the captured image a film-like effect of vertical image shaking generated when a film is played back on a movie projector.

A fourth exemplary embodiment will be described below based on an image processing apparatus capable of applying to the captured image a film-like effect of image brightness unevenness (hereinafter referred to as flickering) to the captured image generated when a film is played back on a movie projector.

Figure 19:
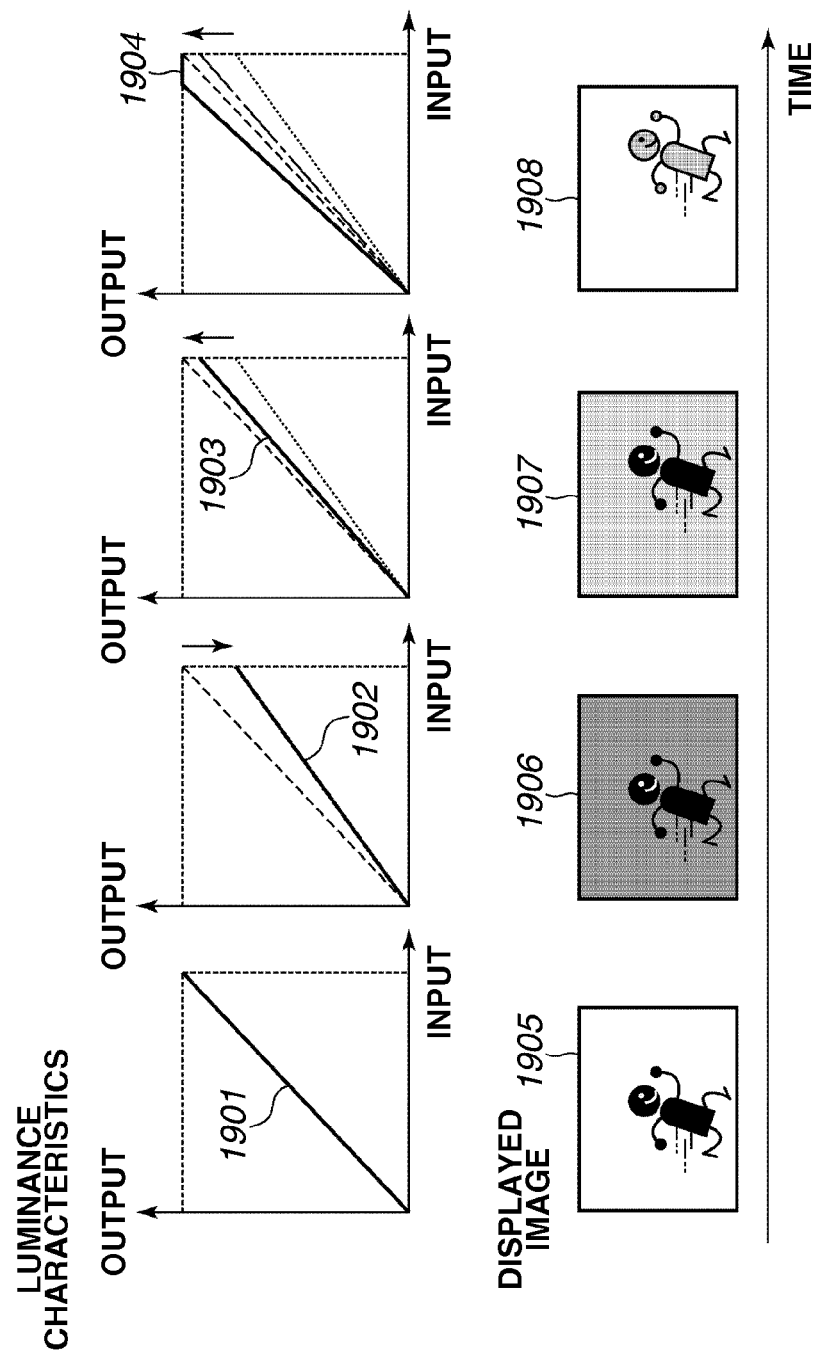
FIG. 19 illustrates processing for correcting a luminance signal for achieving flickering according to the fourth exemplary embodiment of the present invention.

FIG. 19 illustrates processing for correcting a luminance signal for achieving flickering according to the present exemplary embodiment. To achieve flickering of the finally displayed and recorded image, the present exemplary embodiment uses a method for differentiating the luminance signal input/output characteristics.

In correction processing, the system controller successively changes the luminance component of the output image by differentiating the luminance signal input/output characteristics for the input captured image. In the present exemplary embodiment, the minimum unit of change in luminance signal is equal to the minimum resolution of the output image signal, and the minimum unit of time is equal to the refreshing interval of the captured image.

When correction of the reference characteristics is performed in order of characteristic solid lines 1901, 1902, 1903, and 1904, images 1905, 1906, 1907, and 1908 are respectively obtained as the captured image. In this case, the image 1908, the image 1905, the image 1907, and the image 1906 are brighter in this order.

Flickering can be randomly generated, for example, by determining parameter data to be used out of a plurality of pieces of input/output characteristics parameter data by using a random number. The random number for determining parameter data may be the random number generated according to the Gaussian distribution and many other types, but not limited to specific types.

FIG. 18A is a block diagram illustrating a digital video camera as an image processing apparatus according to the fourth exemplary embodiment. An image sensor 1800 applies photoelectric conversion to image-forming incident light. The photo-electrically converted signal is input into a camera signal processing unit 1801. The camera signal processing unit 1801 applies various types of image processing to the photo-electrically converted signal to convert it into a video signal, and outputs the video signal to an encoder unit 1808. The encoder unit 1808 encodes the video signal received from the camera signal processing unit 1801 in a predetermined recording format, and records the resultant video signal into a recording medium 1809.

Signal processing in the camera signal processing unit 1801 will be described below. When the signal is input into the camera signal processing unit 1801, an image processing unit 1804 applies various types of signal processing to each of signal components (luminance component, color component, and black component). The image processing unit 1804 stores the processed signal in a frame memory 1805 as a captured image.

A characteristic data storage unit 1807 stores a plurality of pieces of parameter data for determining the input/output characteristics of the luminance of the video signal. For example, when the input/output characteristics are represented by a linear function such as the solid lines 1901 to 1904, the parameter data includes an inclination of the straight line and a section. With the characteristic solid line 1904, the output is clipped at a point when the input is large. This clipped point and the clipped value are also included in the parameter data. Then, a system controller 1802 transmits the determined parameter data to a correction processing unit 1806.

The correction processing unit 1806 determines the input/output characteristics of the luminance according to the parameter data transmitted from the characteristic data storage unit 1807, corrects the captured image stored in the frame memory 1805 according to the input/output characteristics, and outputs the corrected image.

Since the above-described correction processing is performed by the image processing unit 1804 after the luminance (Y) signal and color-difference (U and V) signals, the result of the correction processing does not affect the processing of the luminance component performed by the image processing unit 1804 even if the output characteristics has changed through correction.

An SG 1803 generates a signal for controlling a timing of driving the image sensor 1800, and supplies the generated signal to the image sensor 1800 and the system controller 1802.

The system controller 1802 controls a camera block including the image sensor 1800 and the camera signal processing unit 1801. The system controller 1802 issues to the image sensor 1800 an instruction about a signal accumulation interval and a signal readout timing.

The system controller 1802 sets to the image processing unit 1804 parameters required for image quality setting in various types of signal processing. The system controller 1802 specifies the input/output characteristics parameter data to the characteristic data storage unit 1807.

The system controller 1802 issues to the correction processing unit 1806 an instruction about a timing of readout from the frame memory 1805 and an instruction about the validation or invalidation of correction processing. The system controller 1802 issues to the SG 1803 an instruction about a timing of driving the image sensor 1800.

Figure 20:
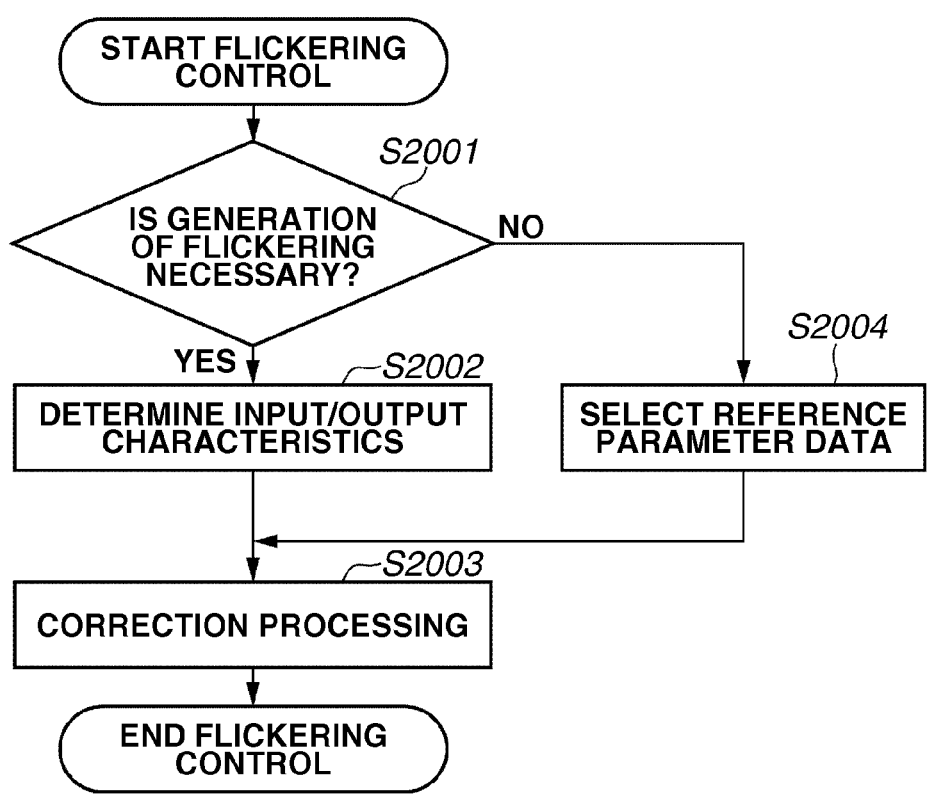
FIG. 20 is a flowchart illustrating processing for correcting the luminance signal according to the fourth exemplary embodiment of the present invention.

The system controller 1802 according to the present exemplary embodiment instructs the correction processing unit 1806 and the characteristic data storage unit 1807 to perform correction processing and characteristic data determination processing, respectively. The flowchart of the processing will be described below with reference to FIG. 20.

The above-described correction and determination control is performed in an image capturing mode in which image processing for applying an effect of flickering to the captured image is performed. Alternatively, the correction and determination control is also performed as post-processing after successive moving image readout from a memory such as the recording medium 1809. This processing is started in synchronization with a vertical synchronization signal, and a series of processing is repeated by the vertical synchronization signal.

In step S2001, the system controller 1802 acquires the flickering control operation state based on current image capturing mode information and determines whether the generation of flickering is necessary. When the system controller 1802 determines that the generation of flickering is necessary based on the acquired operation state (YES in step S2001), the processing proceeds to step S2002. On the other hand, when the system controller 1802 determines that the generation of flickering is not necessary (NO in step S2001), the processing proceeds to step S2004.

In step S2002, to generate flickering, the system controller 1802 determines parameter data for changing the input/output characteristics stored in a characteristic data storage unit 1807. In this case, the system controller 1802 selects any one of a plurality of pieces of parameter data to change the amount of flickering.

For example, to randomly generate the amount of flickering, the system controller 1802 determines parameter data based on a value acquired at random from the random number generation unit. Upon completion of determination of parameter data, the processing proceeds to step S2003. In step S2003, the correction processing unit 1806 performs correction processing by using the parameter data determined in step S2002, and the processing of the flickering control ends.

In step S2004, to stop flickering, the system controller 1802 selects reference parameter data out of the input/output characteristics parameter data stored in the characteristic data storage unit 1807. Thus, the same characteristics are provided while flickering is stopped. Upon completion of selection of reference parameter data, the processing proceeds to step S2003.

As described above, in the fourth exemplary embodiment, the system controller 1802 applies correction processing for changing the luminance signal input/output characteristics to the captured image in addition to the regular image processing. This enables applying to the captured image a film-like effect of image brightness unevenness generated when a film is played back on a movie projector.

FIG. 18B is a block diagram illustrating an exemplary embodiment in a case of collectively applying the correction processing for giving an effect of flickering in the gamma processing in the image processing unit 1804 performed also in regular image capturing.

A white balance processing unit 1810 performs white balance processing, and outputs red (R), green (G), and blue (B) signals. Upon reception of these signals, the correction processing unit 1806 performs processing based on the luminance signal and color signals separately. Specifically, the correction processing unit 1806 prepares RGB signals for luminance signal and RGB signals for color signals, and applies gamma correction suitable for each signal.

Subsequently, the correction processing unit 1806 generates the luminance (Y) signal based on the RGB signals for luminance signal, and generates color-difference (Cb and Cr) signals based on the RGB signals for color signals, and outputs them to a color-balance correction unit 1811.

In these processes, the correction processing unit 1806 converts the gamma curve to be applied to the RGB signals for luminance signal into a gamma curve in consideration of the input/output characteristics according to the present exemplary embodiment. Thus, an effect of flickering can be achieved without additionally providing a processing block and a memory for flickering.

A fifth exemplary embodiment will be described below based on an image processing apparatus capable of applying to an image in an overlapping way the above-described visual effects (scratches, flickering, and vertical shaking) generated when a film is played back on a movie projector. Effects of scratches, flickering, and vertical shaking will be applied in a similar way to the above-described exemplary embodiments, and detailed descriptions thereof will be omitted.

FIGS. 21A and 21B are a block diagram illustrating a digital video camera as an image processing apparatus according to the fifth exemplary embodiment.

An image sensor 2100 applies photoelectric conversion to image-forming incident light. The photo-electrically converted signal is input into a camera signal processing unit 2101. The camera signal processing unit 2101 applies various types of image processing to the photo-electrically converted signal to convert it to a video signal, and outputs the video signal to an encoder unit 2113. The encoder unit 2113 encodes the video signal received from the camera signal processing unit 2101 in a predetermined recording format, and records the resultant video signal to a recording medium 2114.

Signal processing in the camera signal processing unit 2101 will be described below. When the signal is input into the camera signal processing unit 2101, an image processing unit 2104 applies various types of signal processing to the signal similar to the first exemplary embodiment, and outputs a luminance signal and color-difference signals. The image processing unit 2104 stores the processed signal in a first frame memory 2105 as a captured image.

Second, third, and fourth frame memories 2106, 2107, and 2108 are used to temporarily store results of various types of processing for providing film-like effects.

Processing units for applying film-like effects will be described below. A clipping processing unit 2109 clips an image from a predetermined clipping position to generate vertical shaking. A correction processing unit 2110 corrects the input/output characteristics of the luminance of the image to generate flickering.

A combination processing unit 2111 combines a scratch noise image with a captured image to apply scratches to the captured image. A masking processing unit 2112 applies a masking image for hiding noise generated in clipping processing.

An SG 2103 generates a signal for controlling a timing of driving the image sensor 2100, and supplies the generated signal to the image sensor 2100 and a system controller 2102.

The system controller 2102 controls a camera block including the image sensor 2100 and the camera signal processing unit 2101. The system controller 2102 issues to the image sensor 2100 an instruction about a signal accumulation interval and a signal readout timing. The system controller 2102 sets to the image processing unit 2104 parameters required for image quality setting in various types of signal processing.

The system controller 2102 issues to the clipping processing unit 2109 an instruction for validating or invalidating clipped control, an instruction for specifying a clipping position from the first frame memory 2105, an instruction about a timing of readout from the first frame memory 2105, and an instruction about a timing of writing to the second frame memory 2106.

The system controller 2102 issues to the correction processing unit 2110 an instruction for validating or invalidating correction processing, an instruction for specifying input/output characteristics parameter data, an instruction about a timing of readout from the second frame memory 2106, and an instruction about a timing of writing to the third frame memory 2107. The system controller 2102 issues to the combination processing unit 2111 an instruction for validating or invalidating combination control, an instruction for specifying a noise image (not illustrated) to be combined, an instruction about a timing of readout from the third frame memory 2107, and an instruction about a timing of writing to the fourth frame memory 2108.

The system controller 2102 issues to the masking processing unit 2112 an instruction about a size and color of a masking image to be superimposed in masking image control, an instruction about a timing of readout from the fourth frame memory 2108, and an instruction for starting and canceling a relevant operation. The system controller 2102 issues to the SG 2103 an instruction about a timing of driving the image sensor 2100.

The system controller 2102 according to the present exemplary embodiment controls the clipping processing unit 2109, the correction processing unit 2110, the combination processing unit 2111, and the masking processing unit 2112.

Figure 22:
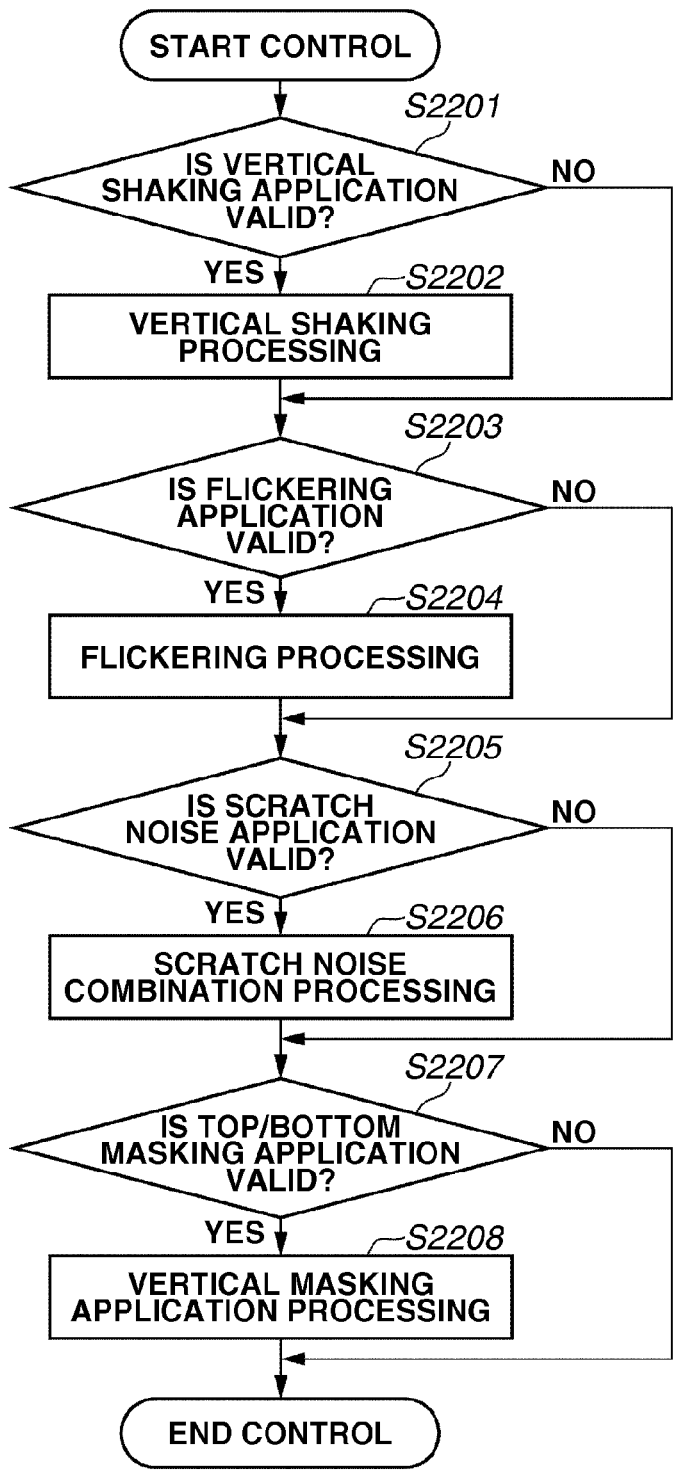
FIG. 22 is a flowchart illustrating processing for overlapping a plurality of film-like effects according to the fifth exemplary embodiment of the present invention.

FIG. 22 is a flowchart illustrating control operations performed by the system controller 2102 and relevant processing performed by each unit.

The above-described control is performed in an image capturing mode in which image processing for applying a plurality of film-like effects to the captured image is performed. Alternatively, the control is performed as post-processing after successive moving image readout from a memory such as the recording medium 2114. This processing is started in synchronization with a vertical synchronization signal, and a series of processing is repeated by the vertical synchronization signal.

In step S2201, the system controller 2102 acquires information such as the image capturing mode and various settings, and determines the validity or invalidity of vertical shaking. When the system controller 2102 determines the validity of vertical shaking (YES in step S2201), the system controller 2102 instructs the clipping processing unit 2109 to perform clipping processing, and the processing proceeds to step S2202. On the other hand, when the system controller 2102 determines the invalidity of vertical shaking (NO in step S2201), the system controller 2102 instructs the clipping processing unit 2109 not to perform clipping control, and the processing proceeds to step S2203.

In step S2202, the clipping processing unit 2109 applies the clipping processing described in the third exemplary embodiment to the image data read from the first frame memory 2105. The clipping processing unit 2109 performs similar masking processing to that in steps S1605 and S1606 (flowchart in FIG. 16), and stores the clipped image data in the second frame memory 2106. Then, the processing proceeds to step S2203.

In step S2203, the system controller 2102 acquires information such as the image capturing mode and various settings, and determines the validity or invalidity of flickering. When the system controller 2102 determines the validity of flickering (YES in step S2203), the system controller 2102 instructs the correction processing unit 2110 to perform correction processing, and the processing proceeds to step S2204. On the other hand, when the system controller 2102 determines the invalidity of flickering (NO in step S2203), the system controller 2102 instructs the correction processing unit 2110 not to perform correction processing, and processing proceeds to step S2205.

In step S2204, the correction processing unit 2110 applies the correction of the luminance signal input/output characteristics to the image data read from the second frame memory 2106, similar to the fourth exemplary embodiment, to perform flickering control. The system controller 2102 instructs the correction processing unit 2110 to perform processing for one sequence according to the flowchart in FIG. 20 based on various settings. The correction processing unit 2110 stores the corrected image data in the third frame memory 2107, and the processing proceeds to step S2205.

In step S2205, the system controller 2102 acquires information such as the image capturing mode and various settings, and determines the validity or invalidity of scratch application. When the system controller 2102 determines the validity of scratch application (YES in step S2205), the system controller 2102 instructs the combination processing unit 2111 to perform the scratch noise combination processing, and the processing proceeds to step S2206. On the other hand, when the system controller 2102 determines the invalidity of scratch application (NO in step S2205), the system controller 2102 instructs the combination processing unit 2111 not to perform the scratch noise combination processing, and the processing proceeds to step S2206.

In step S2206, the combination processing unit 2111 applies the scratch noise combination processing to the image data read from the third frame memory 2107, similar to the second exemplary embodiment. The system controller 2102 instructs the combination processing unit 2111 to perform processing for one sequence according to the flowchart in FIG. 11 based on various settings. The system controller 2102 determines a clipping position and a combination position of the scratch noise data. The combination processing unit 2111 stores the combined image data in the fourth frame memory 2108, and the processing proceeds to step S2207.

In step S2207, the system controller 2102 acquires information such as the image capturing mode and various settings, and determines the validity or invalidity of top/bottom masking application. When the system controller 2102 determines the validity of top/bottom masking application (YES in step S2207), the system controller 2102 instructs the masking processing unit 2112 to perform the masking image combination processing, and the processing proceeds to step S2208. On the other hand, when the system controller 2102 determines the invalidity of top/bottom masking (NO in step S2207), the system controller 2102 instructs the masking processing unit 2112 not to perform the masking image combination processing, and the processing of the control sequence ends.

In step S2208, the masking processing unit 2112 applies the masking image application processing to the image data read from the fourth frame memory 2108, similar to the fourth exemplary embodiment. The masking processing unit 2112 performs similar masking processing to the processing in steps S1607 and S1608 (flowchart in FIG. 16). The masking processing unit 2112 outputs the processed image data to the encoder unit 2113 as image data having undergone various types of signal processing by the camera signal processing unit 2101, and the processing of the first sequence ends.

As described above, in the fifth exemplary embodiment, scratches, flickering, and vertical shaking are applied in an overlapping way to the image of the input image data. Thus, visual effects generated when a film is played back on a movie projector can be given to the image more faithfully.

FIG. 21B illustrates an image processing apparatus according to the present exemplary embodiment capable of collectively applying visual effects in parallel with various types of processing in the regular image capturing mode.

In the present exemplary embodiment, the clipping processing unit 2109 normally once buffers an image read from the image sensor 2100 in a frame memory for image angle adjustment such as centering and unnecessary pixel cutting, and performs other clipping processing. The clipping processing unit 2109 also serves as an electronic image stabilization function for correcting shaking of the entire image due to camera shaking.

In the present exemplary embodiment, the system controller 2102 instructs the clipping processing unit 2109 to perform clipping processing for vertical shaking. Like in FIG. 18B, the system controller 2102 instructs the correction processing unit 2110 for performing gamma correction for the luminance signal performed also at the time of normal image capturing in the image processing unit 2104 to perform gamma correction based on a gamma curve in consideration of correcting the luminance signal input/output characteristics for flickering. This reduces the number of newly provided processing blocks, achieving high processing speed.

A sixth exemplary embodiment will be described below based on an image processing apparatus capable of applying to a digital image in an overlapping way grain noise and scratches to superimpose onto the digital image visual effects (film-like effects) generated when a film is played back on a movie projector. The methods for generating grain noise and scratches are described in detail in the first and second exemplary embodiments, respectively, and duplicated descriptions will be omitted.

Figure 24:
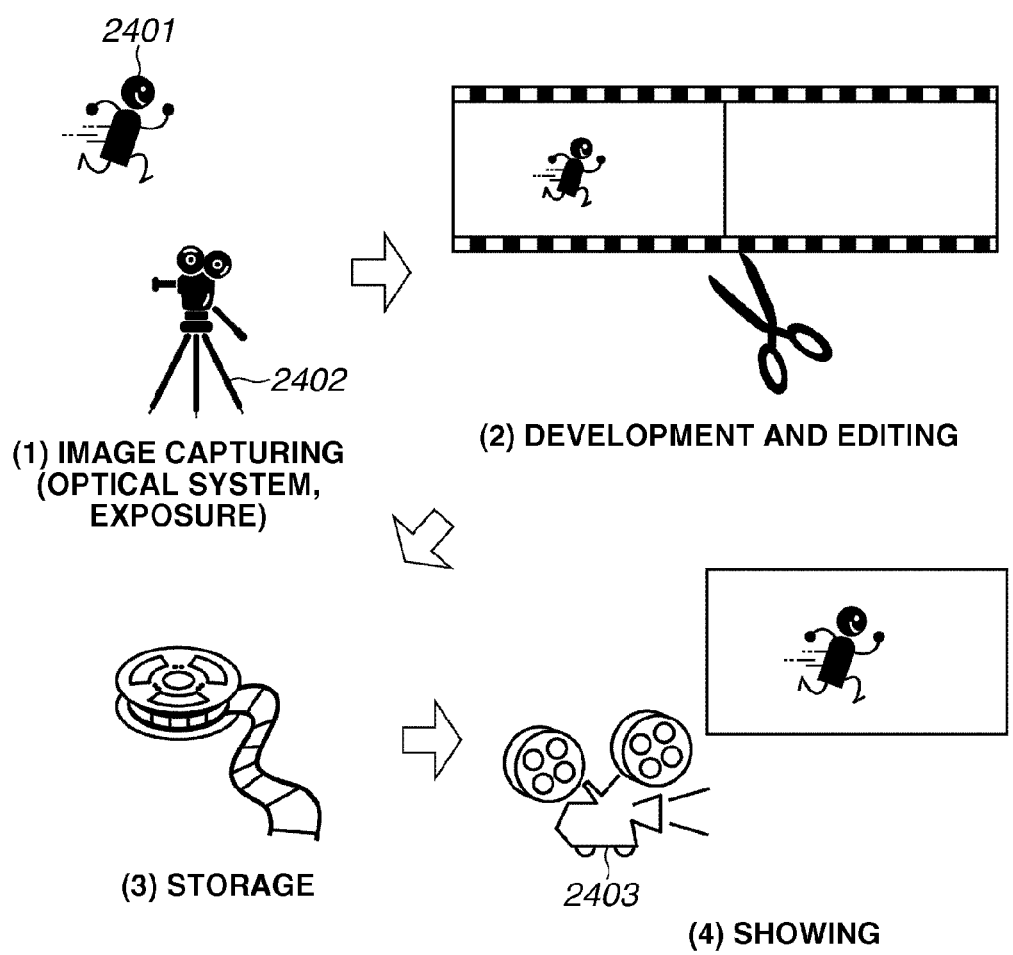
FIG. 24 describes processes from recording to playback in moving image capturing by using a film as a recording medium according to the sixth exemplary embodiment of the present invention.

FIG. 24 illustrates moving image capturing processes by using a film as a recording medium, ranging from recording (hereinafter referred to as image capturing) to playback (hereinafter referred to as showing). FIG. 25 is a table illustrating phenomena, effects, and implementation methods for each of the processes illustrated in FIG. 24. For the process (1) (image capturing), the table includes phenomena (A) and (B) affecting the result of showing, effects (A-1), (A-2), and (B) by the phenomena, and methods for achieving the effects on a simulation basis through image processing.

The moving image capturing processes are grouped into four processes: (1) image capturing, (2) development and editing, (3) storage, and (4) showing. Grain noise is generated, for example, by a development technique known as "silver retention" in the process (2) (development and editing).

Scratches are generated, for example, when the running film is scratched in the process (4) (showing). Specifically, grain noise and scratches are generated by different causes in the showing process of a film image. These two types of noises have different characteristics.

In the first and second exemplary embodiments and the present exemplary embodiment, these two types of noises are achieved by combining respective noise images simulating target noise with a captured image.

In the process (1) (image capturing), (A-1) peripheral light quantity reduction and (A-2) distortion are caused by (A) optical characteristic effect of an optical system used for image capturing. In the process (3) (storage), (A) color fading and (B) noise are caused by (A) film degradation due to aging and (B) dust and stain adhesion, respectively.

In the process (1), an effect of distortion can be given to the image through (A-2) display image deformation. In the processes (2) and (3), an effect of noise can be given to the image on a simulation basis through (B) random grain noise application. In the process (3), an effect of color fading can be given to the image through (A) color balance and color gain correction.

When applying a plurality of film-like effects, giving the above-described effects in order corresponding to the film image capturing processes enables obtaining a more desirable result. When applying both grain noise and scratches, the development and editing process causing grain noise precedes the showing process that causes scratches.

Therefore, in the present exemplary embodiment, grain noise is first combined with the input image data and then scratches are applied to the resultant image data. Thus, a more faithful film-like effect can be obtained.

Figure 23:
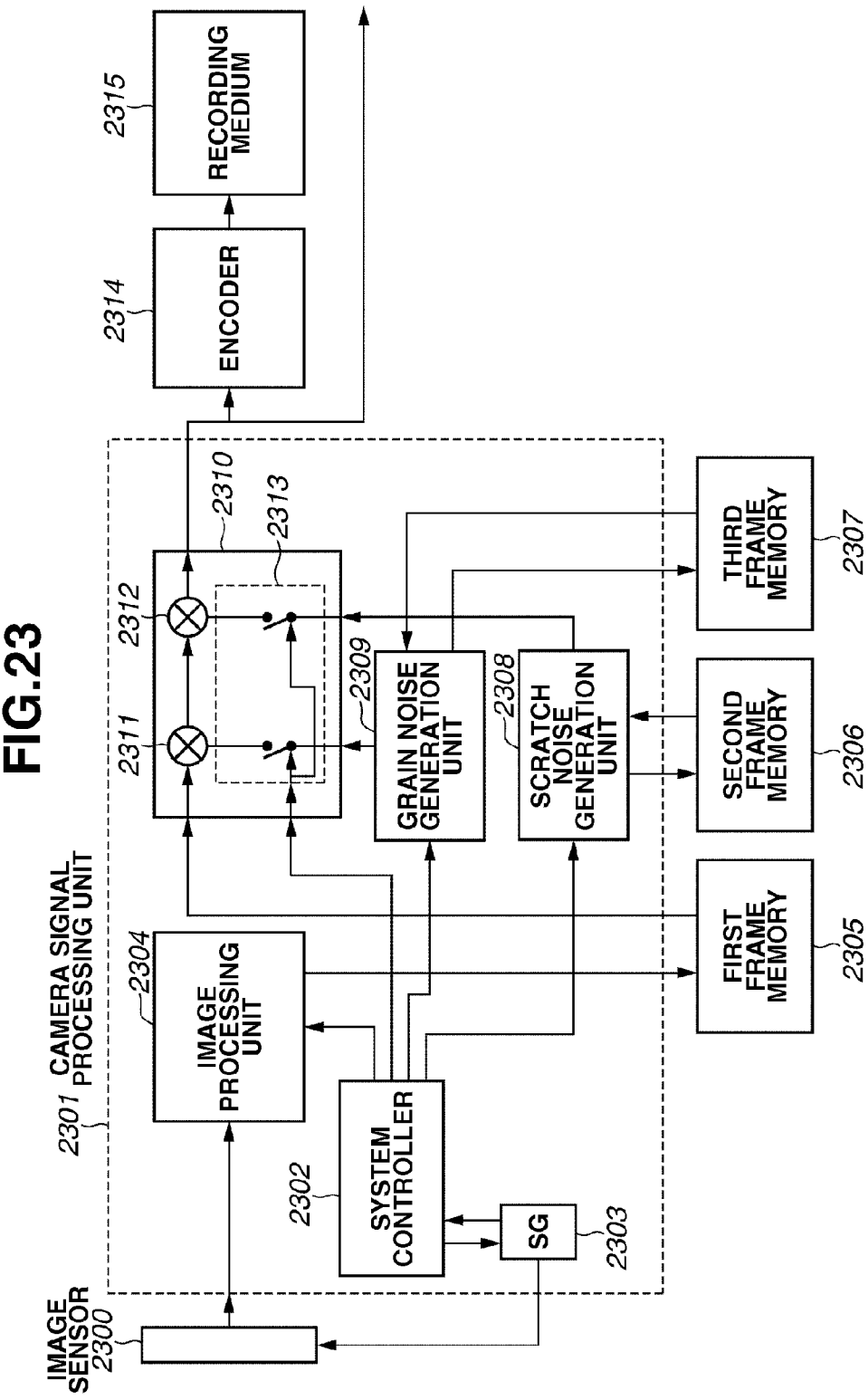
FIG. 23 is a block diagram illustrating an example image processing apparatus according to a sixth exemplary embodiment of the present invention.

FIG. 23 is a block diagram illustrating a digital video camera as an image processing apparatus according to the sixth exemplary embodiment. An image sensor 2300 applies photoelectric conversion to image-forming incident light. The photo-electrically converted signal is input into a camera signal processing unit 2301.

The camera signal processing unit 2301 applies various types of image processing to the photo-electrically converted signal to convert it to a video signal, and outputs the video signal to an encoder unit 2314. The encoder unit 2314 encodes the video signal received from the camera signal processing unit 2301 in a predetermined recording format, and records the resultant video signal to a recording medium 2315.

Signal processing in the camera signal processing unit 2301 will be described below. When the signal is input into the signal processing unit 2301, an image processing unit 2304 applies various types of signal processing to the signal, similar to the first exemplary embodiment. The image processing unit 2304 stores the processed signal in a first frame memory 2305 as a captured image.

Based on an instruction from a system controller 2302 (second specification unit), a scratch generation unit (selection unit) 2308 performs generation and clipping of a scratch noise image. Noise image data (second noise data) stored in a second frame memory 2306 (second storage unit) is processed, similar to the second exemplary embodiment, and then combined by a combination processing unit 2310.

Based on an instruction from the system controller 2302 (first specification unit), a grain noise generation unit (clipping unit) 2309 performs generation and clipping of a grain noise image. Noise image data (first noise data) stored in a third frame memory 2307 (first storage unit) is processed, similar to the first exemplary embodiment, and combined by the combination processing unit 2310.

The combination processing unit 2310 is capable of sequentially combining the captured image stored in the first frame memory 2305 with two different images. A first combination unit 2311 combines the image data stored in the first frame memory 2305 with grain noise image data to form a first input image.

A second combination unit 2312 combines the image data output from the first combination unit 2311 with scratch noise image data to form a second input image.

A selection control unit 2313 selects whether image data to be combined is to be input to the first combination unit 2311 and the second combination unit 2312. The selection control unit 2313 can select image data input to the first combination unit 2311 and the second combination unit 2312 independently of each other. When image data is to be input neither to the first combination unit 2311 nor the second combination unit 2312, the image data stored in the first frame memory 2305 or the image data output from the first combination unit 2311 will be output as it is.

An SG 2303 generates a signal for controlling a timing of driving the image sensor 2300. The SG 2303 supplies the generated signal to the image sensor 2300 and the system controller 2302.

The system controller 2302 controls a camera block including the image sensor 2300 and the camera signal processing unit 2301. The system controller 2302 issues to the image sensor 2300 an instruction about a signal accumulation interval and a signal readout timing. The system controller 2302 issues to the image processing unit 2304 parameters required for image quality setting in various types of signal processing.

The system controller 2302 issues to the combination processing unit 2310 an instruction about a timing of readout of the captured image to be combined in the first frame memory 2305, an instruction about the combination ratio for the first combination unit 2311 and the second combination unit 2312, and an instruction about whether each of the first combination unit 2311 and the second combination unit 2312 performs combination.

To generate scratches, the system controller 2302 issues to the scratch noise generation unit 2308 an instruction about a timing of readout and writing of the noise data from/to the second frame memory 2306, an instruction about a clipping position and size, an instruction about a size for resizing, and an instruction about a pasting position for combination.

To generate grain noise, the system controller 2302 issues to the grain noise generation unit 2309 an instruction about a timing of readout and writing of the noise data from/to the third frame memory 2307, an instruction about a clipping position and size, an instruction about a size for resizing, and an instruction about a pasting position for combination. The system controller 2302 issues to the SG 2303 an instruction about a timing of driving the image sensor 200.

Figure 26:
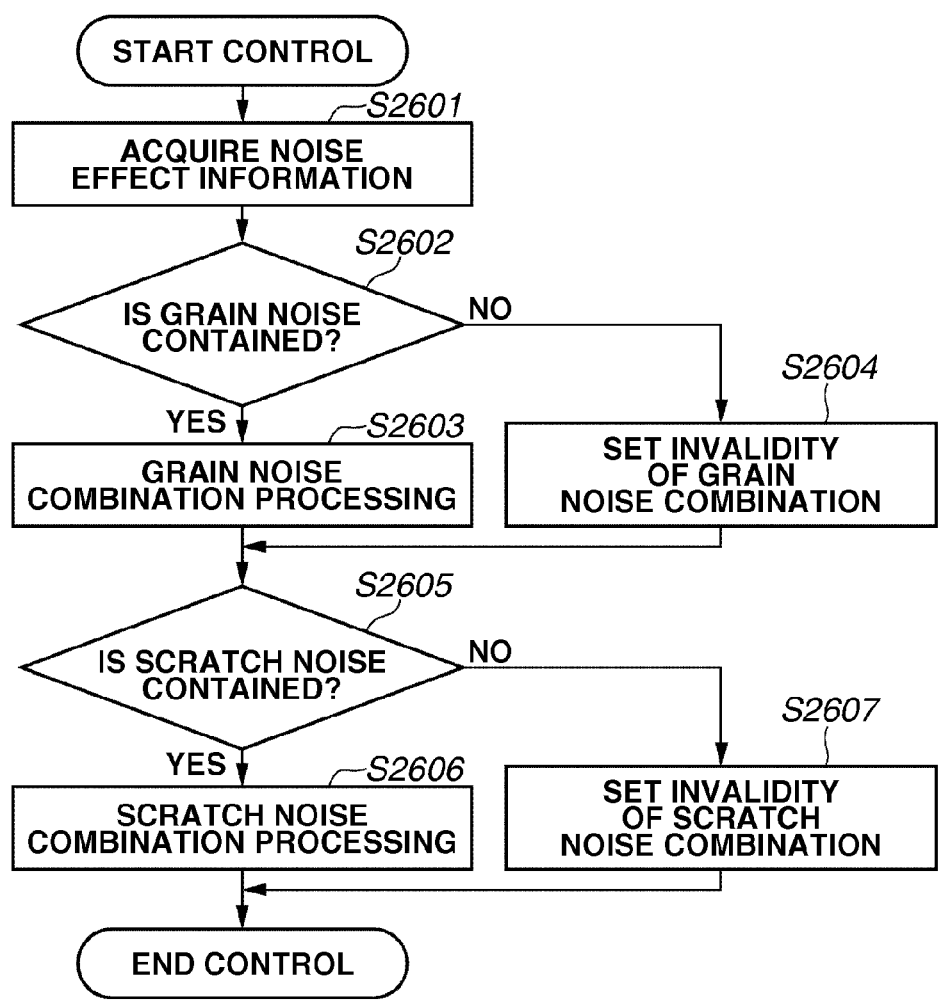
FIG. 26 is a flowchart illustrating processing for overlapping a plurality of film-like effects according to the sixth exemplary embodiment of the present invention.
Figure 27:
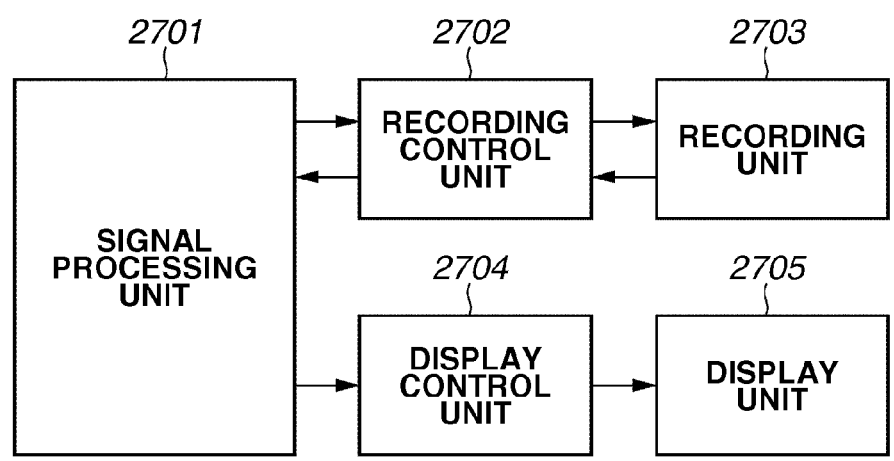
FIG. 27 is a block diagram illustrating an example image processing apparatus according to other exemplary embodiments of the present invention.

The system controller 2302 according to the present exemplary embodiment instructs the combination processing unit 2310 to perform combined image selection control. FIG. 26 is a flowchart illustrating the control operation and relevant processing performed by each unit.

The above-described selection control is performed in an image capturing mode in which a plurality of noise film-like effects is applied to the captured image. Alternatively, the selection control is performed as post-processing after successive moving image readout from a memory such as the recording medium 2315. This processing is started in synchronization with a vertical synchronization signal, and a series of processing is repeated by the vertical synchronization signal.

When combining grain noise and scratches with the captured image in an overlapping way, combining grain noise and scratches in this order as described above enables obtaining an effect close to that when a film is actually shown. Therefore, the combination processing unit 2310 inputs the noise image from the grain noise generation unit 2309 as an image for the combination by the first combination unit 2311, and inputs the noise image from the scratch noise generation unit 2308 as an image for combination by the second combination unit 2312.

In step S2601, the system controller 2302 acquires the type of noise effect to be applied to the captured image stored in the first frame memory 2305, and the processing proceeds to step S2602. In step S2602, the system controller 2302 determines whether grain noise is contained in the type of noise effect acquired in step S2601. When grain noise is contained (YES in step S2602), the processing proceeds to step S2603. On the other hand, when grain noise is not contained (NO in step S2602), the processing proceeds to step S2604.

In step S2603, the system controller 2302 validates grain noise combination, and performs the grain noise combination processing described in the first exemplary embodiment. The system controller 2302 instructs the grain noise generation unit 2309 and the combination processing unit 2310 to perform processing for one sequence according to the flowchart in FIG. 7 based on various settings.

In the present exemplary embodiment, the first combination processing unit 2311 combines the image data input from the first frame memory 2305 with grain noise data. The first combination processing unit 2311 outputs the resultant combined data to the second combination unit 2312, and the processing proceeds to step S2605. In step S2604, the system controller 2302 determines the invalidity setting of grain noise combination, and the processing proceeds to step S2605.

In step S2605, the system controller 2302 determines whether scratches are contained in the type of noise effect acquired in step S2605. When scratch noise is contained (YES in step S2605), the processing proceeds to step S2606. On the other hand, when scratch noise is not contained (NO in step S2605), the processing proceeds to step S2607.

In step S2606, the system controller 2302 validates scratch combination, and performs the scratch noise combination processing described in the second exemplary embodiment. The system controller 2302 instructs the scratch noise generation unit 2308 and the combination processing unit 2310 to perform processing for one sequence according to the flowchart in FIG. 11 based on various settings.

In the present exemplary embodiment, the scratch noise generation unit 2308 generates scratch noise data, and the second combination unit 2312 combines the resultant image data output by the first combination unit 2311 with the scratch noise data. The combination processing unit 2310 outputs the resultant combined data as an output of the camera signal processing unit 2301, and the processing of the control sequence ends.

In step S2607, the system controller 2302 determines the invalidity setting of scratch combination, and the processing ends the control sequence.

As described above, in the sixth exemplary embodiment, two types of noises, i.e., grain noise and scratches having different temporal and spatial degree of randomization are separately generated and then combined with the image data in an overlapping way. Thus, visual effects generated when a film is played back on a movie projector can be given to the image more faithfully.

Further, these noises are combined with the image data in order of film image capturing processes to enable obtaining a more faithful noise effect.

In the present exemplary embodiment, grain noise image data is first combined with the input image data, and then scratch noise image data is combined with the resultant image data. In this case, the combination method is not limited thereto. The grain noise image data may be first combined with the scratch noise image data, and then the resultant combined data may be combined with the input image data.

In this case, before combining the grain noise image data with the scratch noise image data, the permeability is given to the grain noise image data in advance. Then, the grain noise image data is combined (pasted) with the scratch noise image data with a ratio of 0:1. Then, the input image data is combined with the resultant combined noise image data with a ratio of 0:1. The grain noise is combined with a combination ratio corresponding to the permeability, and an output image is such that scratches are pasted thereon, thus achieving a more faithful image as described in the present exemplary embodiment.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image processing apparatus which performs image processing to a plurality of input frame images, the image processing apparatus comprising:
   one or more processors; and
   a memory storing instructions which, when the instructions are executed by the one or more processors, cause the image processing apparatus to function as:
   a clipping unit configured to clip each image of the plurality of input frame images at a position determined based on a random value;
   a masking unit configured to partially mask the image processed by the clipping unit; and an outputting unit configured to output a plurality of frame images which are processed by the clipping unit and masked by the masking unit as a moving image, wherein the masking unit masks the image processed by the clipping unit so that a noise area included in the clipped image is hidden.

2. The image processing apparatus according to claim 1, wherein the clipping unit changes a readout start position of an input frame image based on the random value.

3. The image processing apparatus according to claim 1, wherein the instructions stored in the memory further causes the image processing apparatus to function as a luminance changing unit configured to randomly change input- output characteristics of luminance for a plurality of frame images.

4. The image processing apparatus according to claim 3, wherein the luminance changing unit randomly changes the input-output gamma characteristics of the plurality of frame images.

5. The image processing apparatus according to claim 3, wherein the masking unit masks the image of which luminance is changed by the luminance changing unit.

6. The image processing apparatus according to claim 3, wherein the instructions stored in the memory further causes the image processing apparatus to function as a combining unit configured to add noise data to the images processed by the luminance changing unit.

7. The image processing apparatus according to claim 3, wherein the instructions stored in the memory further causes the image processing apparatus to function as a setting unit configured to set changing of luminance by the luminance changing unit as valid or invalid.

8. The image processing apparatus according to claim 1, wherein the instructions stored in the memory further causes the image processing apparatus to function as a recording unit configured to record the output moving image in a recording medium.

9. The image processing apparatus according to claim 1, wherein the instructions stored in the memory further causes the image processing apparatus to function as a displaying unit configured to display the output moving image.

10. The image processing apparatus according to claim 1, wherein the masking unit masks the image processed by the clipping unit at the top of the frame and the bottom of the frame.

11. The image processing apparatus according to claim 1, wherein a portion of the image which is not masked has a letter box aspect ratio.

12. The image processing apparatus according to claim 1, wherein the clipped image has a predetermined ratio and the masked image has another predetermined ratio size.

13. The image processing apparatus according to claim 1, further comprising an image capturing unit configured to capture the plurality of input frame images sequentially.

14. The image processing apparatus according to claim 1, wherein the clipping unit is configured to clip each image of the plurality of frames at a position randomly displaced in at least one of vertical and horizontal directions.

15. The image processing apparatus according to claim 1, wherein the instructions stored in the memory further causes the image processing apparatus to function as a clip setting unit configured to set clipping by the clipping unit as valid or invalid.

16. The image processing apparatus according to claim 1, wherein the instructions stored in the memory further causes the image processing apparatus to function as a mask setting unit configured to set masking image by the masking unit as valid or invalid.

17. An image processing method performing image processing to a plurality of input frame images, the image processing method comprising:
clipping each image of the plurality of input frame images at a position determined based on a random value;
partially masking the image processed by the clipping; and
outputting a plurality of frame images processed by the clipping and masked by the masking as a moving image, wherein the image processed by the clipping is masked by the masking so that a noise area included in the clipped image is hidden.

18. An image processing apparatus which performs image processing to a plurality of input frame images, the image processing apparatus comprising:
one or more processors; and
a memory storing instructions which, when the instructions are executed by the one or more processors, cause the image processing apparatus to function as:
a luminance changing unit configured to randomly change an input-output characteristic of luminance among the plurality of input frame images and change luminance among the plurality of input frame images based on the each input-output characteristic of luminance as a film-like effect; and
an outputting unit configured to output a plurality of frame images which are processed by the luminance changing unit as a moving image.

19. The image processing apparatus according to claim 18, wherein the instructions stored in the memory further causes the image processing apparatus to function as a masking unit configured to partially mask the image processed by the luminance changing unit. input frame images at a position determined based on a random value.

20. The image processing apparatus according to claim 19, wherein the masking unit masks the image processed by the clipping unit at the top of the frame and the bottom of the frame.

21. The image processing apparatus according to claim 19, wherein the masked image has a letter box aspect ratio.

22. The image processing apparatus according to claim 20, wherein the clipping unit is configured to clip each frame of the plurality of frames at a position randomly displaced in at least one of vertical and horizontal directions.

23. The image processing apparatus according to claim 18, wherein the instructions stored in the memory further causes the image processing apparatus to function as a combining unit configured to add noise data to the image processed by the luminance changing unit.

24. The image processing apparatus according to claim 18, wherein the luminance changing unit randomly changes an input-output gamma characteristic among the plurality of input frame images in order to randomly change an input-output characteristic of luminance among the plurality of input frame images.

25. The image processing apparatus according to claim 18, wherein the instructions stored in the memory further causes the image processing apparatus to function as a recording unit configured to record the output moving image in a recording medium.

26. The image processing apparatus according to claim 18, wherein the instructions stored in the memory further causes the image processing apparatus to function as a displaying unit configured to display the output moving image.

27. The image processing apparatus according to claim 18, further comprising an image capturing unit configured to capture the plurality of input frame images sequentially.

28. The image processing apparatus according to claim 18, wherein the instructions stored in the memory further causes the image processing apparatus to function as a setting unit configured to set changing of luminance by the luminance changing unit as valid or invalid.

29. The image processing apparatus according to claim 18, wherein the instructions stored in the memory further causes the image processing apparatus to function as a clipping unit configured to clip each image of the plurality of input frame images at a position determined based on a random value.

30. An image processing method for performing image processing to a plurality of input frame images, the method comprising:
    randomly changing an input-output characteristic of luminance among the plurality of input frame images and change luminance among the plurality of input frame images based on the each input-output characteristic of luminance as a film-like effect; and
    outputting a plurality of frame images processed by the randomly changing input- output characteristics of luminance as a moving image.

31. An image capturing apparatus which performs image processing to a plurality of captured frame images, the image capturing apparatus comprising:
    an image capturing unit configured to capture a plurality of frame images sequentially;
    one or more processors; and
    a memory storing instructions which, when the instructions are executed by the one or more processors, cause the image processing apparatus to function as:
    a clipping unit configured to clip each image of the plurality of captured frame images at a position determined based on a random value;
    a masking unit configured to partially mask the image processed by the clipping unit; and
    an outputting unit configured to output a plurality of frame images which are processed by the clipping unit and masked by the masking unit as a moving image,
    wherein the masking unit masks the image processed by the clipping unit so that a noise area included in the clipped image is hidden.

32. An image processing apparatus which performs image processing to a plurality of captured frame images, the image capturing apparatus comprising:
    an image capturing unit configured to capture a plurality of frame images sequentially;
    one or more processors; and
    a memory storing instructions which, when the instructions are executed by the one or more processors, cause the image processing apparatus to function as:
    a luminance changing unit configured to randomly change an input-output characteristic of luminance among the plurality of input frame images and change luminance among the plurality of input frame images based on the each input-output characteristic of luminance as a film-like effect; and
    an outputting unit configured to output a plurality of frame images processed by the luminance changing unit as a moving image.

33. A non-transitory computer readable storage medium storing a program for controlling a computer to execute respective steps of an image processing method which performs image processing to a plurality of input frame images, the steps comprising:
    clipping each image of the plurality of input frame images at a position determined based on a random value;
    partially masking the images processed by the clipping; and
    outputting a plurality of frame images processed by the clipping and masked by the masking as a moving image, wherein the image processed by the clipping is masked by the masking so that a noise area included in the clipped image is hidden.

34. A non-transitory computer readable storage medium storing a program for controlling a computer to execute respective steps of an image processing method which performs image processing to a plurality of input frame images, the steps comprising:
    randomly changing an input-output characteristic of luminance among the plurality of input frame images and changing luminance among of the plurality of input frame images based on the each input-output characteristic of luminance as a film-like effect; and
    outputting a plurality of frame images processed by the randomly changing input- output characteristics of luminance as a moving image.

35. An image processing apparatus which performs image processing to a plurality of input frame images, the image processing apparatus comprising:
    one or more processors; and
    a memory storing instructions which, when the instructions are executed by the one or more processors, cause the image processing apparatus to function as:
    a clipping unit configured to clip each image of the plurality of input frame images at a position determined based on a random value;
    a masking unit configured to apply a mask having an opening of a predetermined aspect ratio to each image of the plurality of frame images processed by the clipping unit; and
    an outputting unit configured to output a plurality of frame images which are processed by the clipping unit and masked by the masking unit as a moving image, wherein the masking unit masks the each image of the plurality of frame images so that a noise area included in the clipped image is hidden.

36. An image processing method for performing image processing to a plurality of input frame images, the method comprising:
    clipping each image of the plurality of input frame images at a position determined based on a random value;
    masking to apply a mask having an opening of a predetermined aspect ratio to each image of the plurality of frame images processed in the clipping; and
    outputting a plurality of frame images which are processed in the clipping and masked in the masking as a moving image, wherein the each image of the plurality of frame images is masked in the masking so that a noise area included in the clipped image is hidden.

37. A non-transitory computer readable storage medium storing a program for controlling a computer to execute respective steps of an image processing method according to claim 36.

38. An image processing apparatus which performs image processing to a plurality of input frame images, the image processing apparatus comprising:
    one or more processors; and a memory storing instructions which, when the instructions are executed by the one or more processors, cause the image processing apparatus to function as:
a luminance changing unit configured to randomly change an input-output characteristic among the plurality of input frame images and change luminance among the plurality of input frame images based on the each input-output characteristic of luminance in order that the plurality of input frame images are like a film played back with a movie film projector; and
an outputting unit configured to output a plurality of frame images which are processed by the luminance changing unit as a moving image.

* * * * *